United States Patent
Nakamura et al.

(10) Patent No.: US 12,168,277 B2
(45) Date of Patent: Dec. 17, 2024

(54) PALLET TRANSFER SYSTEM, PALLET TRANSFER METHOD, AND PALLET TRANSFER PROGRAM

(71) Applicant: DMG MORI CO., LTD., Yamatokoriyama (JP)

(72) Inventors: Takayuki Nakamura, Yamatokoriyama (JP); Hideaki Yoshioka, Yamatokoriyama (JP); Xinwei Sun, Yamatokoriyama (JP); Junya Nagata, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 825 days.

(21) Appl. No.: 17/423,174

(22) PCT Filed: Aug. 7, 2019

(86) PCT No.: PCT/JP2019/031037
§ 371 (c)(1),
(2) Date: Jul. 15, 2021

(87) PCT Pub. No.: WO2020/152891
PCT Pub. Date: Jul. 30, 2020

(65) Prior Publication Data
US 2022/0134500 A1    May 5, 2022

(30) Foreign Application Priority Data
Jan. 25, 2019    (JP) .................................. 2019-010834

(51) Int. Cl.
*B23Q 7/14*    (2006.01)
(52) U.S. Cl.
CPC .................................. *B23Q 7/1431* (2013.01)

(58) Field of Classification Search
CPC .................................................... B23Q 7/1431
See application file for complete search history.

(56) References Cited

U.S. PATENT DOCUMENTS

| 4,160,937 A | * | 7/1979 | Fiorini | .................. | B23Q 15/12 |
| | | | | | 318/634 |
| 5,920,480 A | * | 7/1999 | Nakamura | ............. | B23Q 41/08 |
| | | | | | 700/114 |

(Continued)

FOREIGN PATENT DOCUMENTS

| CN | 104648933 A | 5/2015 |
| EP | 2 839 923 A1 | 2/2015 |

(Continued)

OTHER PUBLICATIONS

International Search Report issued Oct. 21, 2019 in PCT/JP2019/031037 filed Aug. 7, 2019, 2 pages.

*Primary Examiner* — Kyle O Logan
(74) *Attorney, Agent, or Firm* — Oblon, McClelland, Maier & Neustadt, L.L.P.

(57) ABSTRACT

A technique appropriately controls transfer order of a pallet. A pallet transfer system includes a transfer device, a pallet storage, a work station, a machine tool, and a control device. The control device transfers a second pallet from the work station to the pallet storage when the machining of the workpiece attached to a first pallet is completed in a state where the first pallet is in the machine tool and the second pallet is in the work station, and the control device transfers the first pallet from the machine tool to the work station after completion of the transfer of the second pallet from the work station to the pallet storage, or in parallel with the transfer of the second pallet from the work station to the pallet storage.

8 Claims, 16 Drawing Sheets

(56) References Cited

U.S. PATENT DOCUMENTS

| | | | | |
|---|---|---|---|---|
| 6,052,627 | A * | 4/2000 | Nakamura | B23Q 7/1426 |
| | | | | 700/182 |
| 7,550,681 | B2 * | 6/2009 | Wang | G01G 7/00 |
| | | | | 177/1 |
| 7,845,483 | B2 * | 12/2010 | Noguchi | B23P 21/004 |
| | | | | 198/346.3 |
| 2004/0019394 | A1 * | 1/2004 | Red | G05B 19/4097 |
| | | | | 700/19 |
| 2006/0208893 | A1 * | 9/2006 | Anson | G08B 13/1472 |
| | | | | 700/215 |
| 2011/0100783 | A1 * | 5/2011 | Baba | B65G 35/06 |
| | | | | 198/606 |
| 2012/0290126 | A1 * | 11/2012 | Combs | G05B 19/4189 |
| | | | | 198/781.01 |
| 2013/0251482 | A1 * | 9/2013 | Issing | B65G 1/06 |
| | | | | 414/800 |
| 2013/0302128 | A1 * | 11/2013 | Miyazaki | B23Q 3/186 |
| | | | | 29/33 P |
| 2015/0142156 | A1 | 5/2015 | Maseki et al. | |
| 2015/0266151 | A1 * | 9/2015 | Komatsu | B23Q 3/15713 |
| | | | | 483/1 |
| 2016/0263718 | A1 * | 9/2016 | Miyazaki | B23Q 7/1431 |

FOREIGN PATENT DOCUMENTS

| | | |
|---|---|---|
| JP | 7-132446 A | 5/1995 |
| JP | 7-323912 A | 12/1995 |
| JP | 8-252739 A | 10/1996 |
| JP | 9-174371 A | 7/1997 |
| JP | 2001-179570 A | 7/2001 |

* cited by examiner

| TYPE OF WORKPIECE | TRANSFER PRIORITY | SETUP WORK TIME | MACHINING TIME |
|---|---|---|---|
| WORKPIECE 1 | HIGH | 30 MINUTES | 30 MINUTES |
| WORKPIECE 2 | MEDIUM | 40 MINUTES | 1 HOUR |
| WORKPIECE 3 | LOW | 20 MINUTES | 45 MINUTES |
| ⋮ | ⋮ | ⋮ | ⋮ |

PALLET TRANSFER SYSTEM, PALLET TRANSFER METHOD, AND PALLET TRANSFER PROGRAM

TECHNICAL FIELD

The present disclosure relates to pallet transfer control in a pallet transfer system.

BACKGROUND ART

A pallet transfer system capable of sequentially processing a large number of workpieces according to a preset schedule is known. Regarding the pallet transfer system, PTL 1 (Japanese Patent Laying-Open No. 09-174371) discloses "a pallet pool type machining device that can improve the flexibility and expandability in design and manufacturing and reduce cost when a device is newly constructed according to a user's request, when a device adds or expands, or when arrangement is changed".

CITATION LIST

Patent Literature

PTL 1: Japanese Patent Laying-Open No. 09-174371

SUMMARY OF INVENTION

Technical Problem

The pallet transfer system includes a work station, a machine tool, a pallet storage unit, and the like. A worker attaches the workpiece to be machined to a pallet at the work station. When the work of attaching the workpiece is completed, the pallet is transferred to the machine tool, and the machining of the workpiece is started.

The pallet (hereinafter, also referred to as a "machining completed pallet") on which the completed machining of the workpiece is loaded is transferred to the work station. However, when the worker is performing some work on another pallet at the work station, the machining completed pallet cannot be transferred to the work station. In such a case, the machining completed pallet is temporarily stored in the pallet storage unit.

When the worker's work is delayed, the number of machining completed pallets staying in the pallet storage unit increases. As a result, the machined workpiece cannot be sent to a next production process, and productivity of the workpiece is lowered. Thus, a technique for appropriately controlling transfer order of the pallets is desired.

The present disclosure has been made to solve the above-mentioned problems, and an object of the present disclosure is to provide a pallet transfer system capable of appropriately controlling the transfer order of the pallets. Another object of the present disclosure is to provide a pallet transfer method capable of appropriately controlling the transfer order of the pallets. Still another object of the present disclosure is to provide a pallet transfer program capable of appropriately controlling the transfer order of the pallets.

Solution to Problem

In one example of the present disclosure, a pallet transfer system includes: a transfer device configured to transfer a pallet to which a workpiece can be attached to which a workpiece is attachable; a pallet storage that is one of pallet transfer destinations by the transfer device and configured to store a plurality of pallets; a work station that is one of the pallet transfer destinations by the transfer device, where a worker performs work of attaching the workpiece to the pallet transferred from the pallet storage; a machine tool that is one of the pallet transfer destinations by the transfer device and configured to machine the workpiece attached to the pallet at the work station; and a control device configured to control the transfer device. The control device transfers a second pallet from the work station to the pallet storage when machining of the workpiece attached to a first pallet is completed in a state where the first pallet of the plurality of pallets is in the machine tool and the second pallet of the plurality of pallets is in the work station, and the control device transfers the first pallet from the machine tool to the work station after the completion of transfer of the second pallet from the work station to the pallet storage, or in parallel with the transfer of the second pallet from the work station to the pallet storage.

In another example of the present disclosure, a pallet transfer system includes: a transfer device configured to transfer a pallet to which a workpiece is attachable; a pallet storage that is one of pallet transfer destinations by the transfer device and configured to store a plurality of pallets; a work station that is one of the pallet transfer destinations by the transfer device, where a worker performs work of attaching the workpiece to the pallet transferred from the pallet storage; a machine tool that is one of the pallet transfer destinations by the transfer device and configured to machine the workpiece attached to the pallet transferred from the work station; and a control device configured to control the transfer device. The control device transfers a second pallet from the work station to the pallet storage when machining of the workpiece attached to a first pallet is completed within a predetermined time from a present time in a state where the first pallet of the plurality of pallets is in the machine tool and the second pallet of the plurality of pallets is in the work station, and the control device transfers the first pallet from the machine tool to the work station after the completion of transfer of the second pallet from the work station to the pallet storage, or in parallel with the transfer of the second pallet from the work station to the pallet storage, when machining of the workpiece attached to the first pallet is completed.

In one example of the present disclosure, the control device accepts selection of permitting or refusing interruption of the attaching work to the second pallet, and
  starts the transfer of the second pallet from the work station to the pallet storage based on the acceptance of the selection of the permission.

In one example of the present disclosure, the control device transfers the first pallet from the machine tool to the pallet storage based on the acceptance of the selection of the refusal.

In one example of the present disclosure, the control device transfers the first pallet from the work station to the pallet storage while transferring the second pallet from the pallet storage to the work station based on the completion of the removal of the workpiece attached to the first pallet at the work station.

Another example of the present disclosure provides a pallet transfer method in a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet at the work station. The pallet transfer method includes: transferring a second pallet from the work station to the pallet storage when machining of the workpiece attached to a first pallet is completed in a state where the first pallet of the plurality of pallets is in the machine tool and the second pallet of the plurality of pallets is in the work station; and transferring the first pallet from the machine tool to the work station after the completion of transfer of the second pallet from the work station to the pallet storage, or in parallel with the transfer of the second pallet from the work station to the pallet storage.

Another example of the present disclosure provides a pallet transfer method in a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet transferred from the work station. The pallet transfer method includes: transferring a second pallet from the work station to the pallet storage when machining of the workpiece attached to a first pallet is completed in a state where the first pallet of the plurality of pallets is in the machine tool and the second pallet of the plurality of pallets is in the work station; and transferring the first pallet from the machine tool to the work station after the completion of transfer of the second pallet from the work station to the pallet storage, or in parallel with the transfer of the second pallet from the work station to the pallet storage when machining of the workpiece attached to the first pallet is completed.

Another example of the present disclosure provides a pallet transfer program executed by a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet at the work station. The pallet transfer program causes the pallet transfer system to execute: transferring a second pallet from the work station to the pallet storage when machining of the workpiece attached to a first pallet is completed in a state where the first pallet of the plurality of pallets is in the machine tool and the second pallet of the plurality of pallets is in the work station; and transferring the first pallet from the machine tool to the work station after the completion of transfer of the second pallet from the work station to the pallet storage, or in parallel with the transfer of the second pallet from the work station to the pallet storage.

Another example of the present disclosure provides a pallet transfer program executed by a pallet transfer system. The pallet transfer system includes: a transfer device that transfers a pallet to which a workpiece is attachable; a pallet storage that is one of pallet transfer destinations by the transfer device and stores a plurality of pallets; a work station that is one of the pallet transfer destinations by the transfer device, where a worker performs work of attaching the workpiece to the pallet transferred from the pallet storage; and a machine tool that is one of the pallet transfer destinations by the transfer device and machines the workpiece attached to the pallet transferred from the work station. The pallet transfer program causes the pallet transfer system to execute: transferring a second pallet from the work station to the pallet storage when machining of the workpiece attached to a first pallet is completed in a state where the first pallet of the plurality of pallets is in the machine tool and the second pallet of the plurality of pallets is in the work station; and transferring the first pallet from the machine tool to the work station after the completion of transfer of the second pallet from the work station to the pallet storage, or in parallel with the transfer of the second pallet from the work station to the pallet storage when machining of the workpiece attached to the first pallet is completed.

Advantageous Effects of Invention

In a certain aspect, the transfer order of pallets can be appropriately controlled.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 10 is a view illustrating an example of a data structure of workpiece information.

DESCRIPTION OF EMBODIMENTS

Figure 1:
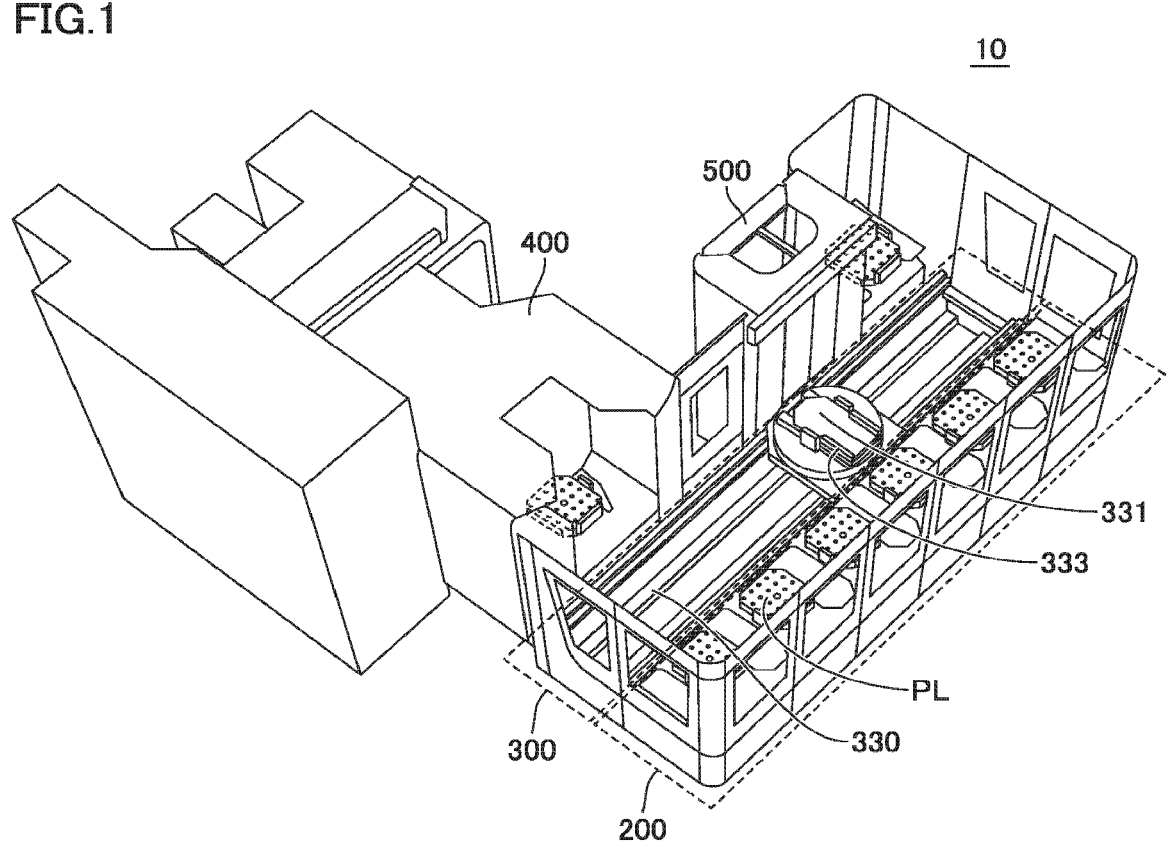
FIG. 1 is a view illustrating an appearance of a pallet transfer system.

Hereinafter, an embodiment of the present invention will be described with reference to the drawings. In the following description, the same parts and components are denoted by the same reference numeral. Their names and functions are the same. Thus, the detailed description thereof will not be repeated. The following embodiments and modifications described below may selectively be combined as appropriate.

<A. Appearance of Pallet Transfer System 10>

With reference to FIG. 1, a pallet transfer system 10 will be described. FIG. 1 is a view illustrating an appearance of pallet transfer system 10.

As illustrated in FIG. 1, pallet transfer system 10 includes at least one pallet storage 200, at least one transfer device 300, at least one machine tool 400, and at least one work station 500.

Pallet storage 200 is one of transfer destinations of a pallet PL by transfer device 300, and is a location that stores pallet PL. A plurality of pallets PL can be stored in pallet storage 200. Pallet storage 200 stores an empty pallet on which a workpiece is not loaded, a pallet on which a workpiece before machining is loaded, a pallet on which a workpiece during machining is loaded, a pallet on which a machined workpiece is loaded, and the like.

Transfer device 300 transfers designated pallet PL to a designated location. More specifically, transfer device 300 includes a rail 330 and a carriage 331. For example, carriage 331 is configured to be movable along rail 330 by a servomotor 335 (see FIG. 2) described later. Carriage 331 has a fork part 333 configured to be drivable in a direction orthogonal to rail 330 (that is, a direction orthogonal to a traveling direction of carriage 331). Carriage 331 moves along rail 330 to a position of pallet PL to be transferred, and the pallet PL to be transferred is placed on carriage 331 using fork part 333. Then, carriage 331 moves along rail 330 to the designated destination, and pallet PL to be transferred is carried into the transfer destination using fork part 333.

Machine tool 400 is one of the transfer destinations of pallet PL by the transfer device 300. Machine tool 400 machines the workpiece attached to pallet PL carried in according to a pre-designed machining program. When the machining of the workpiece is completed, pallet PL in machine tool 400 is transferred to pallet storage 200 or work station 500 by transfer device 300.

Work station 500 is one of transfer destinations of pallet PL by transfer device 300. At work station 500, the worker performs various works on pallet PL that is transferred. As an example, at work station 500, the worker performs the work of attaching the workpiece to be machined to the carried-in pallet PL, the work of removing the machined workpiece from pallet PL, and the like. When the work on pallet PL is completed, the worker performs an operation for instructing work completion. Based on this, transfer device 300 transfers pallet PL in work station 500 to pallet storage 200 or machine tool 400.

<B. Device Configuration of Pallet Transfer System 10>

Figure 2:
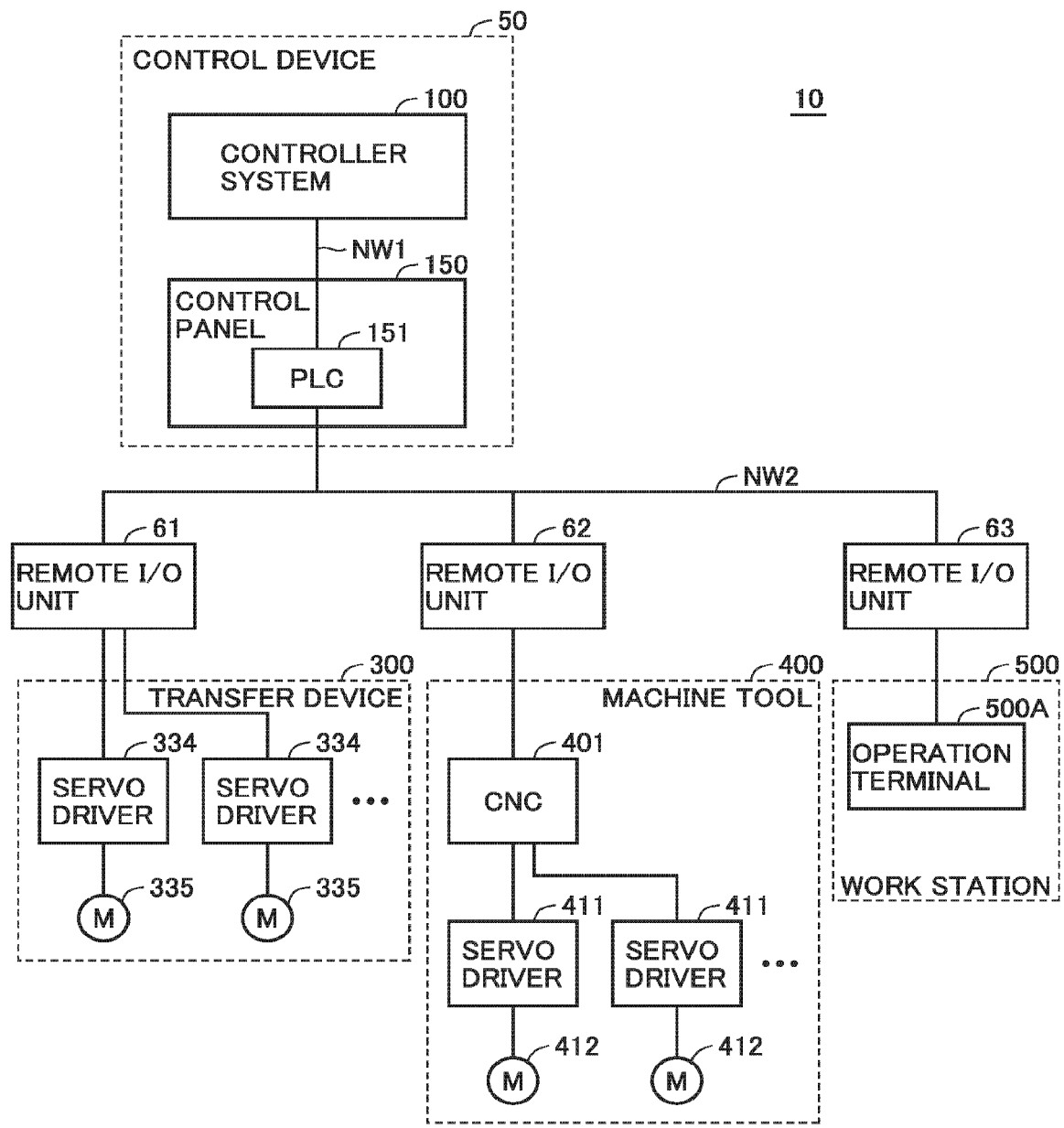
FIG. 2 is a view illustrating an example of a device configuration of the pallet transfer system.

FIG. 2 is a view illustrating an example of a device configuration of pallet transfer system 10. With reference to FIG. 2, an example of the device configuration of pallet transfer system 10 will be described As illustrated in FIG. 2, pallet transfer system 10 includes a control device 50, remote I/O (Input/Output) units 61 to 63, transfer device 300, machine tool 400, and work station 500.

"Control device 50" as used herein means a device that controls pallet transfer system 10. The device configuration of control device 50 is arbitrary. Control device 50 may be constructed with a single control unit or a plurality of control units. In the example of FIG. 2, control device 50 includes a control system 100 and a control panel 150.

Control system 100 is a main computer that controls pallet transfer system 10. Control panel 150 controls various industrial devices that automate the machining process. Control panel 150 includes a PLC 151.

Control system 100 and PLC 151 are connected to a network NW1. Control system 100 and PLC 151 may be connected by wire or wireless. EtherNET (registered trademark) and the like will be adopted for network NW1. Control system 100 transmits a control command to PLC 151 through network NW1. The control command specifies pallet PL to be transferred, the transfer destination of pallet PL, the transfer start/stop of pallet PL, and the like.

Remote I/O units 61 to 63 and PLC 151 are connected to a network NW2. Preferably a field network that performs fixed-period communication guaranteeing a data arrival time is used as network NW2. EtherCAT (registered trademark), EtherNet/IP (registered trademark), CC-Link (registered trademark), CompoNet (registered trademark), and the like are adopted as the field network that performs the fixed-period communication.

Transfer device 300 includes at least one servo driver 334 and at least one servomotor 335. Remote I/O unit 61 is installed in or around transfer device 300. Remote I/O unit 61 mediates data exchange between various drive units (for example, servo driver 334) in transfer device 300 and PLC 151. Servo driver 334 receives a control command from PLC 151 through remote I/O unit 61 at regular intervals, and drives and controls servomotor 335 according to the control command. As an example, one servomotor 335 drives and controls carriage 331 (see FIG. 1), and another servomotor 335 drives and controls above-mentioned fork part 333 (see FIG. 1).

Servo driver 334 sequentially receives an input of a target rotation speed (or a target position) from PLC 151, and controls servomotor 335 such that servomotor 335 rotates at the target rotation speed. More specifically, servo driver 334 calculates an actual rotation speed (or an actual position) of servomotor 335 from a feedback signal of an encoder (not illustrated) for servomotor 335, increases the rotation speed of servomotor 335 when the actual rotation speed is smaller than the target rotation speed, and decreases the rotation speed of servomotor 335 when the actual rotation speed is larger than the target rotation speed. In this manner, servo driver 334 brings the rotation speed of servomotor 335 closer to the target rotation speed while sequentially receiving feedback of the rotation speed of servomotor 335. As a result, transfer device 300 can move pallet PL to any transfer destination.

Machine tool 400 includes a CNC (Computer Numerical Control) 401, a servo driver 411, and a servomotor 412. Remote I/O unit 62 is installed in or around machine tool 400. Remote I/O unit 62 mediates the data exchange between various drive units (for example, CNC 401) in machine tool 400 and PLC 151. Similarly to servo driver 334, servo driver 411 receives a control command from PLC 151 through remote I/O unit 62 at regular intervals, and drives and controls servomotor 412 according to the control command.

Work station 500 includes an operation terminal 500A that accepts an operation by the worker. Remote I/O unit 63 is installed in or around work station 500. Remote I/O unit 63 mediates the data exchange between operation terminal 500A and PLC 151. A worker's work content for operation terminal 500A is transmitted to PLC 151 through remote I/O unit 63 at regular intervals.

<C. Pallet Transfer Process>

Control device 50 of control system 100 transfers the pallet to which the machined workpiece is attached (that is, the machining completed pallet) to work station 500. At this point, when the worker is working on another pallet at work station 500, control device 50 cannot transfer the machining completed pallet to work station 500. Usually, in such a case, the machining completed pallet is temporarily stored in pallet storage 200. However, the number of machining completed pallets staying in pallet storage 200 increases as the worker's work is delayed. As a result, the machined workpiece cannot be sent to a next production process, and productivity of the workpiece is lowered.

For this reason, when the machining completed pallet can be transferred to work station 500, control device 50 forcedly carries out the in-process pallet from work station 500. Then, control device 50 carries the machining completed pallet in work station 500, and the worker removes the machined workpiece from the carried-in machining completed pallet. In this way, the machined workpiece can be transmitted to the next production process by giving priority to the transfer of the machining completed pallet to work station 500. As a result, the productivity of the workpiece is improved.

With reference to FIGS. 3 to 9, specific examples of such a transfer process will be described. FIGS. 3 to 9 arc views illustrating an example of a work process in pallet transfer system 10 in time series.

Figure 3:
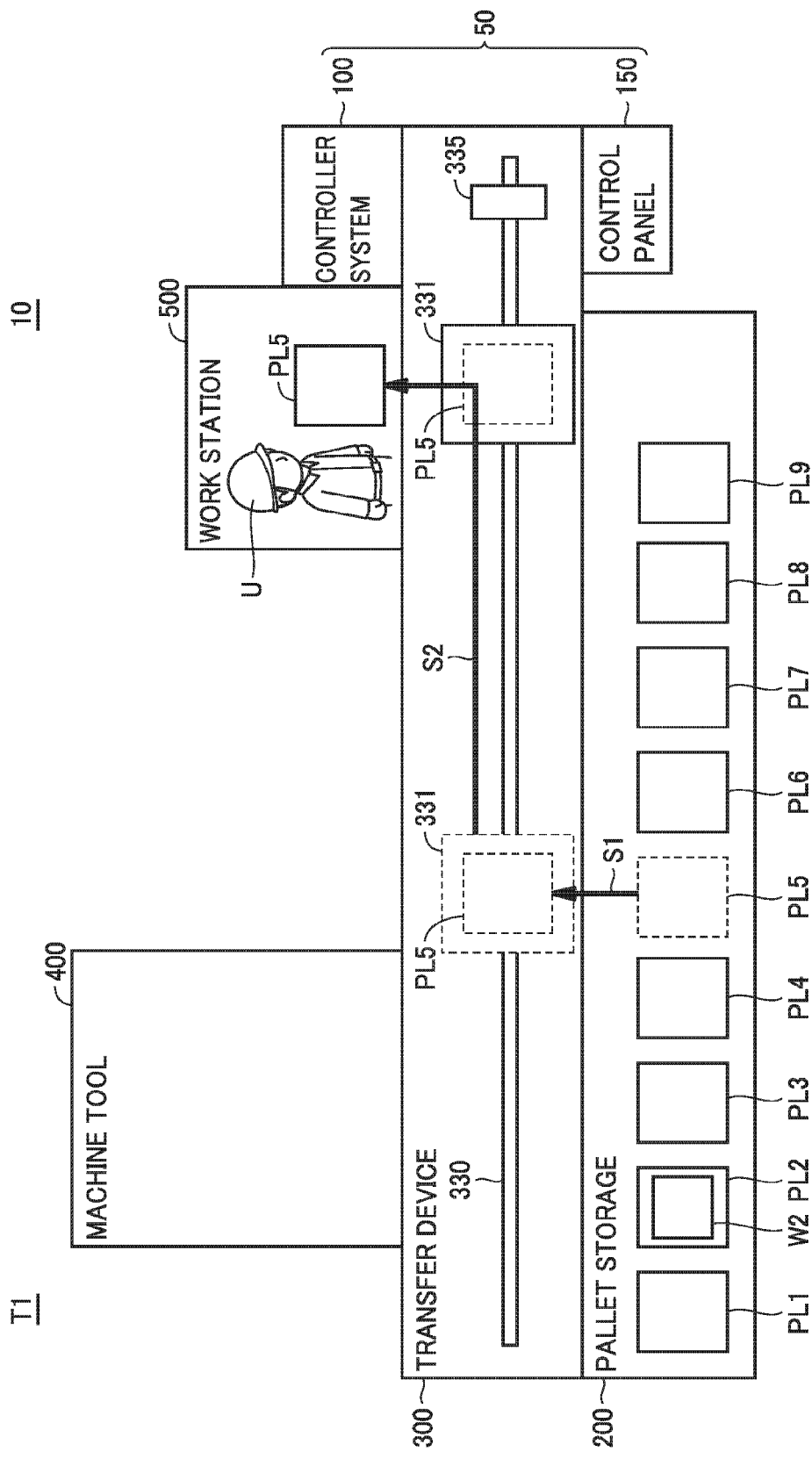
FIG. 3 is a view illustrating a part of a work process in the pallet transfer system.

With reference to FIG. 3, it is assumed that the transfer timing of a pallet PL5 in pallet storage 200 arrives at timing T1. Based on this, controller 50 of control system 100 moves carriage 331 to a front of pallet PL5. Then, control device 50 drives fork part 333 (see FIG. 1) of carriage 331, and puts pallet PL5 on carriage 331 (step S1).

Then, control device 50 moves carriage 331 to a front of work station 500. Then, control device 50 drives fork part 333 of carriage 331, and carries pallet PL5 in work station 500 (step S2). Based on the fact that pallet PL5 is carried in work station 500, a worker U starts the work of attaching a workpiece W5 to pallet PL5.

Figure 4:
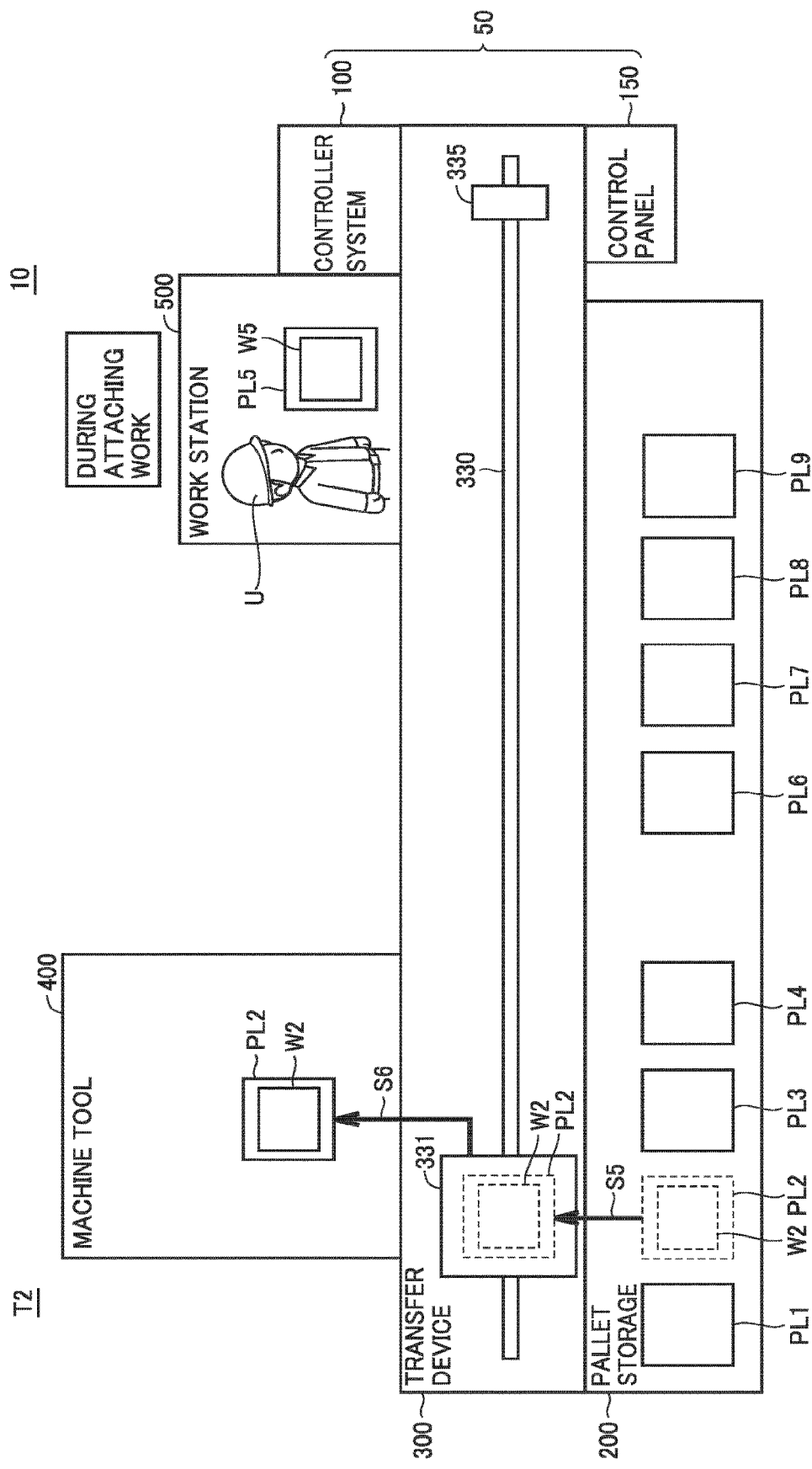
FIG. 4 is a view illustrating a part of the work process in the pallet transfer system.

With reference to FIG. 4, it is assumed that machining timing of a workpiece W2 attached to pallet PL2 arrives at timing T2. Based on this, control device 50 moves carriage 331 to a front of pallet PL2. Then, control device 50 drives fork part 333 of carriage 331 to place pallet PL2 on carriage 331 (step S5).

Then, control device 50 moves carriage 331 to a front of machine tool 400. After that, control device 50 drives fork part 333 of carriage 331 to carry pallet PL2 in machine tool 400 (step S6).

Based on the fact that pallet PL2 is carried in machine tool 400, control system 100 transmits a machining start command to machine tool 400. Machine tool 400 receives the machining start command to start the machining of workpiece W2 attached to pallet PL2 (step S7).

Figure 5:
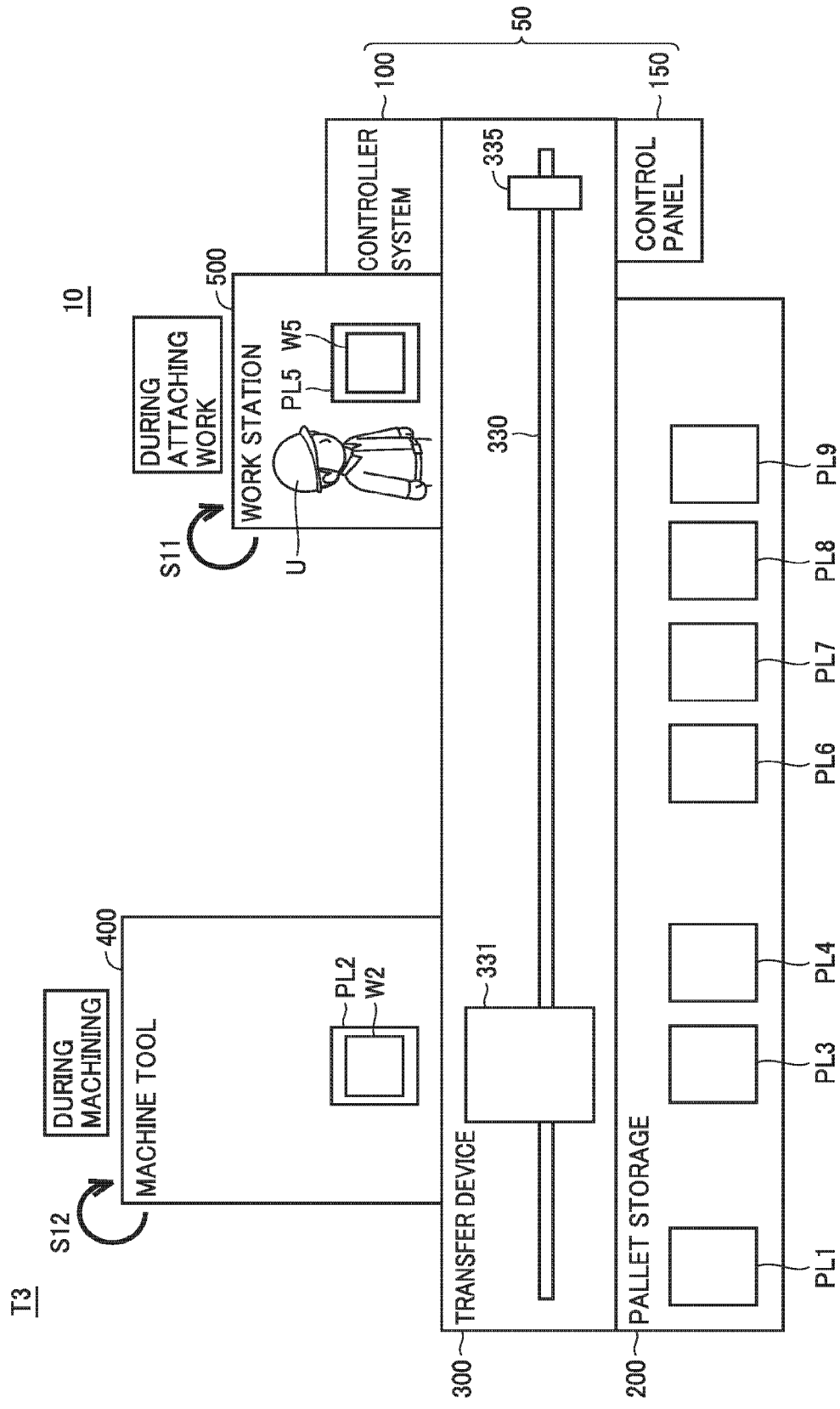
FIG. 5 is a view illustrating a part of the work process in the pallet transfer system.

As a result, as illustrated in FIG. 5, at timing T3, the work of attaching pallet PL5 by worker U (step S11) and the processing of machining workpiece W2 by machine tool 400 (step S12) are performed in parallel.

Figure 6:
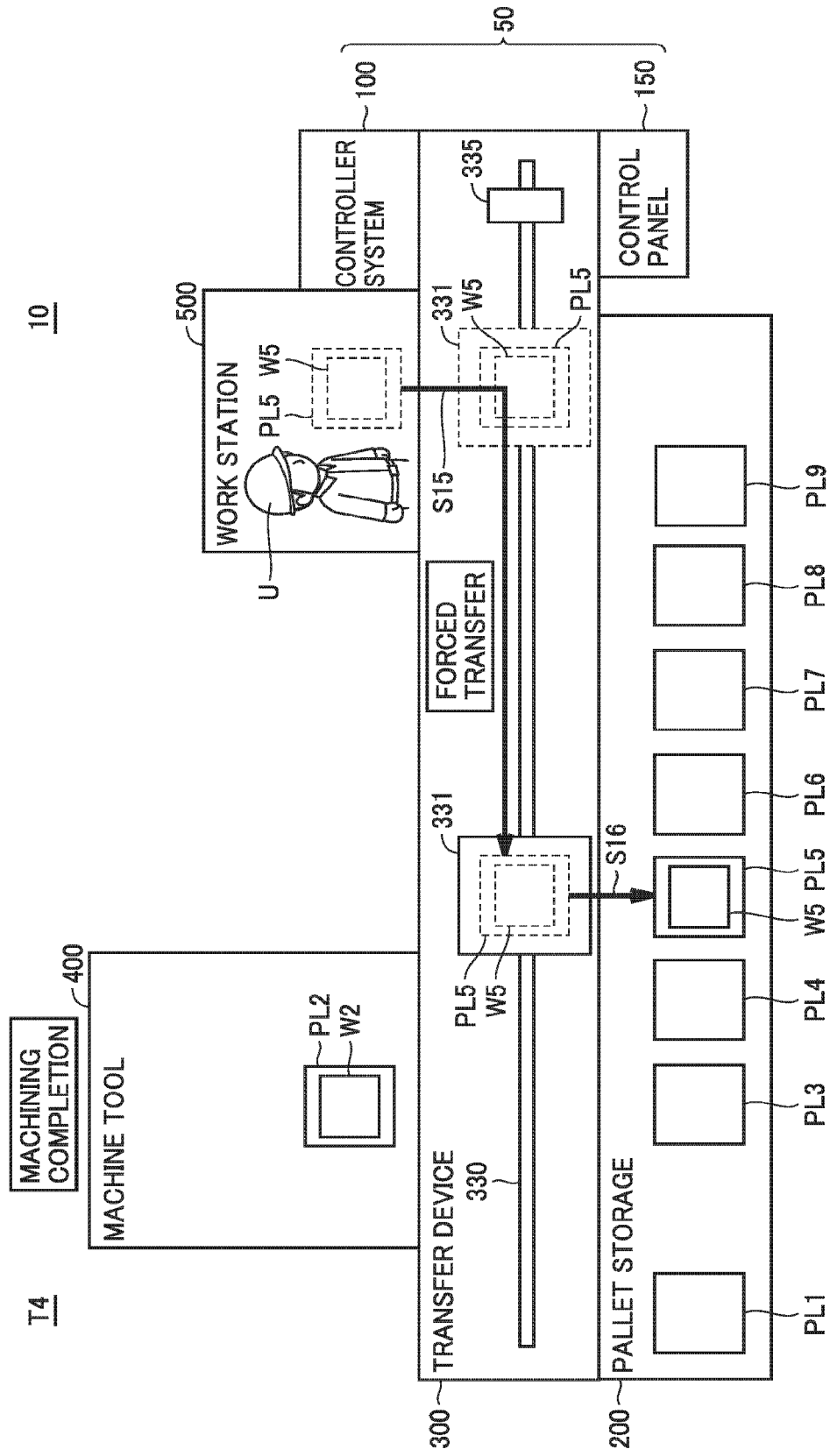
FIG. 6 is a view illustrating a part of the work process in the pallet transfer system.

As illustrated in FIG. 6, it is assumed that the machining of workpiece W2 by machine tool 400 is completed before the work of attaching workpiece W5 by worker U at the timing T4. Based on this, control device 50 forcedly carries out in-process pallet PL5 from work station 500. That is, in the state where pallet PL2 (first pallet) is in machine tool 400 and pallet PL5 (second pallet) is in work station 500, the machining of workpiece W2 attached to pallet PL2 is completed. At that point, control device 50 forcedly transfers pallet PL5 from work station 500 to pallet storage 200.

More specifically, control device 50 moves carriage 331 to a front of work station 500. Then, control device 50 drives fork part 333 of carriage 331 to put pallet PL5 on carriage 331 (step S15). Then, control device 50 moves carriage 331 to a front of a temporary shelter of pallet storage 200. For example, the temporary shelter is any unoccupied space in pallet storage 200. Preferably, the temporary shelter is the unoccupied space closest to work station 500. After that, control device 50 drives fork part 333 of carriage 331 to store pallet PL5 in the temporary shelter of pallet storage 200 (step S16).

Figure 7:
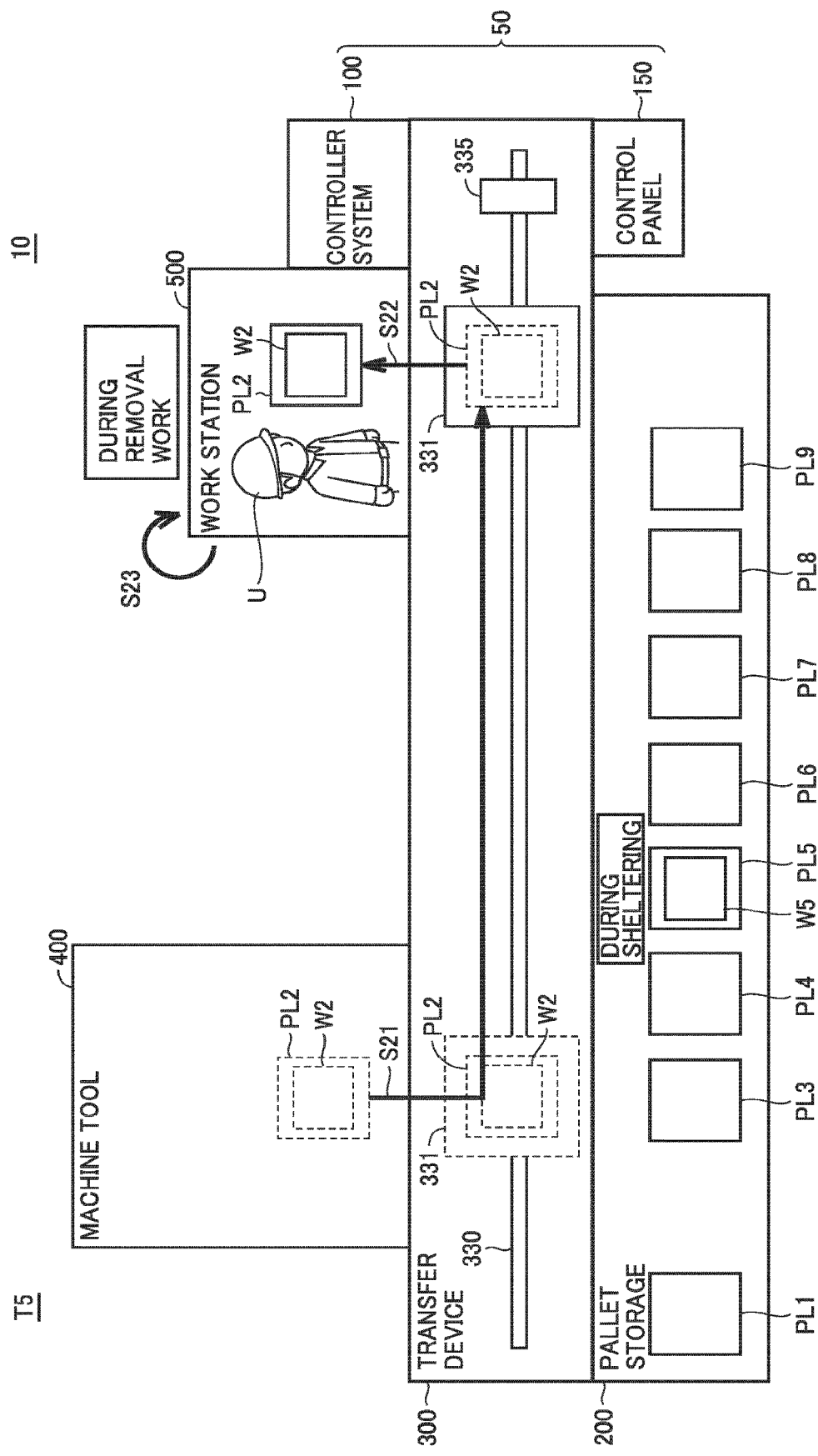
FIG. 7 is a view illustrating a part of the work process in the pallet transfer system.

As illustrated in FIG. 7, it is assumed that the transfer of pallet PL5 to the temporary shelter is completed at timing T5. Based on this, control device 50 transfers pallet PL2 from machine tool 400 to work station 500.

More specifically, control device 50 moves carriage 331 to a front of machine tool 400. Then, control device 50 drives fork part 333 of carriage 331 to place pallet PL2 on carriage 331 (step S21). Then, control device 50 moves carriage 331 to a front of work station 500. Then, control device 50 drives fork part 333 of carriage 331 to carry pallet PL2 in work station 500 (step S22). Based on the fact that pallet PL2 is carried in work station 500, worker U starts the work of removing workpiece W2 from pallet PL2 (step S23).

Figure 8:
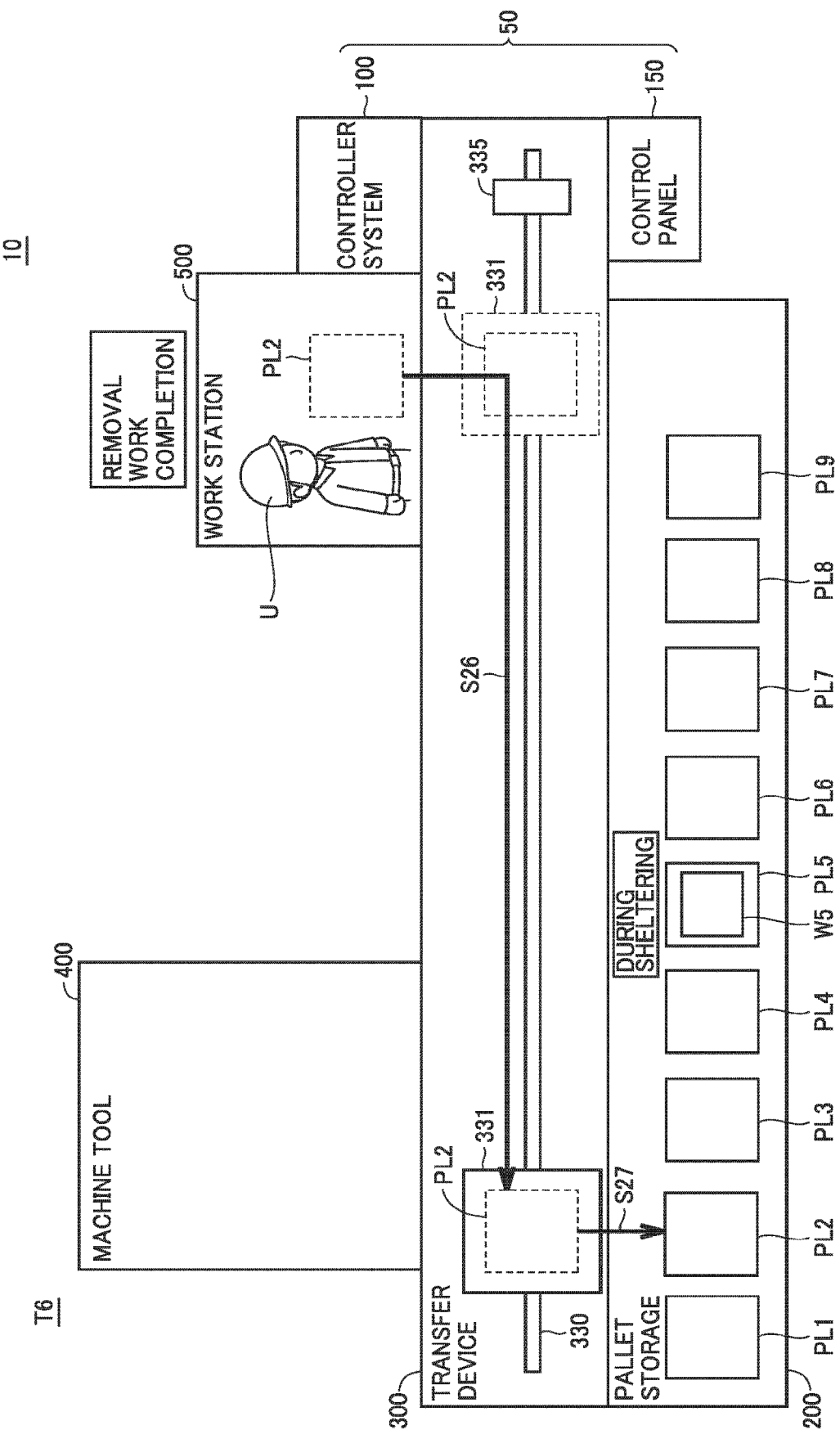
FIG. 8 is a view illustrating a part of the work process in the pallet transfer system.

As illustrated in FIG. 8, it is assumed that the work of removing workpiece W2 from pallet PL2 is completed at timing T6. Based on this, control device 50 transfers pallet PL2 from work station 500 to pallet storage 200. More specifically, control device 50 moves carriage 331 to a front of work station 500. Then, control device 50 drives fork part 333 of carriage 331 to put pallet PL2 on carriage 331 (step S26). Then, control device 50 moves carriage 331 to a front of the unoccupied space in pallet storage 200. Then, control device 50 drives fork part 333 of carriage 331 to store pallet PL2 in the unoccupied space in pallet storage 200 (step S27).

Figure 9:
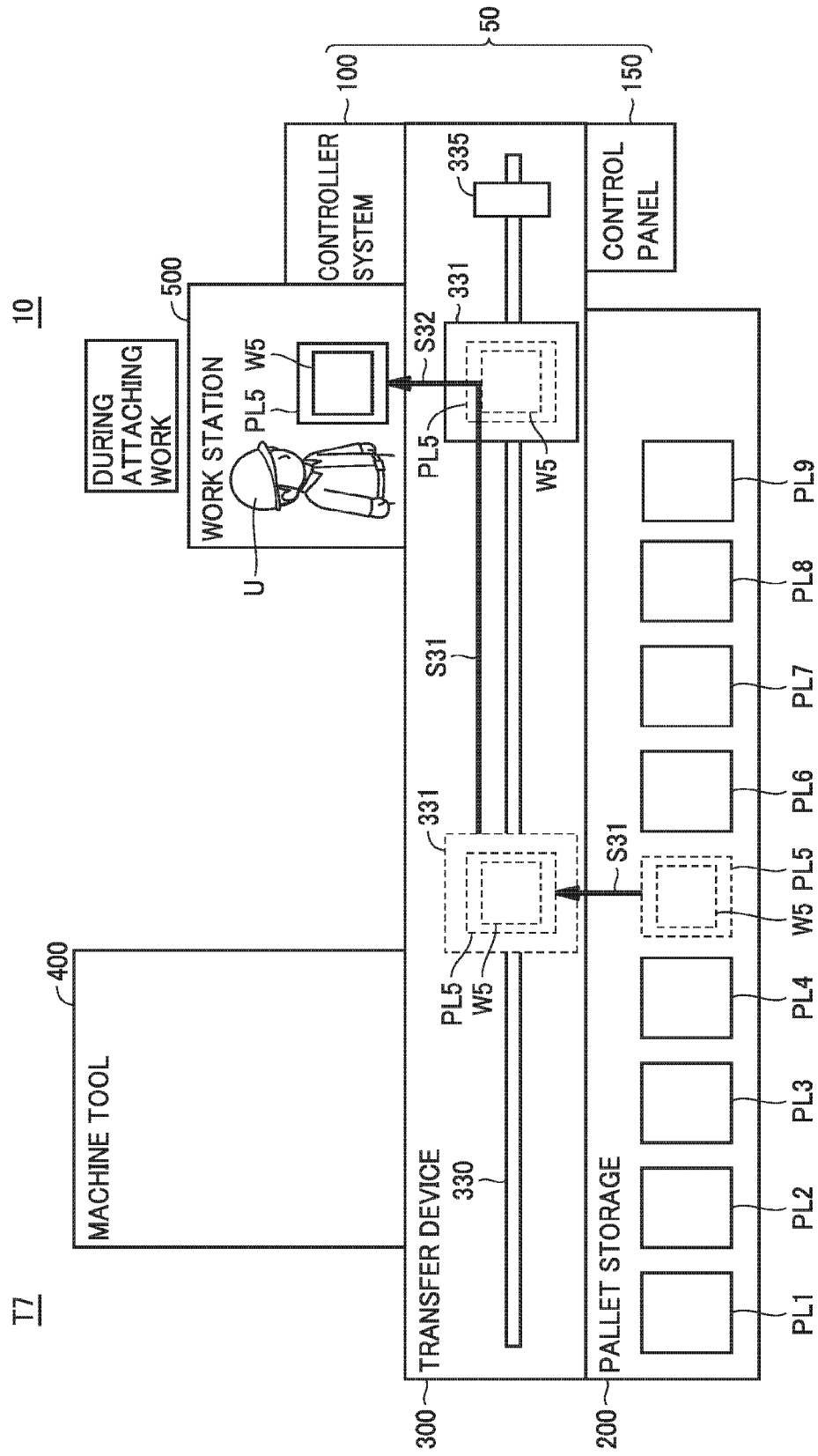
FIG. 9 is a view illustrating a part of a work process in the pallet transfer system.

As illustrated in FIG. 9, it is assumed that the storage of pallet PL2 is completed at timing T7. Based on this, control device 50 transfers temporarily sheltered pallet PL5 from the pallet storage 200 to work station 500.

More specifically, control device 50 moves carriage 331 to a front of temporarily sheltered pallet PL5. Then, control device 50 drives fork part 333 of carriage 331 to put pallet PL5 on carriage 331 (step S31). Then, control device 50 moves carriage 331 to a front of work station 500. Then, control device 50 drives fork part 333 of carriage 331 to carry pallet PL5 in work station 500 (step S32). Based on the fact that pallet PL5 is carried in work station 500, worker U resumes the work of attaching workpiece W5 to pallet PL5.

As described above, when in-process pallet PL5 is in work station 500 in the state where pallet PL2 on which machined workpiece W2 is loaded can be transferred, control device 50 forcedly carries out in-process pallet PL5 from work station 500, and carries pallet PL2 on which machined workpiece W2 is loaded in work station 500. The machined workpiece can be sent to the next production process by prioritizing the transfer of pallet PL2 on which machined workpiece W2 is loaded. As a result, the productivity of the workpiece is improved.

Preferably, before starting the forced transfer of in-process pallet PL5, control device 50 accepts selection for permitting or refusing interruption of the attaching work to pallet PL5. That is, control device 50 accepts the selection for permitting or refusing the forced transfer of pallet PL5. For example, a selection screen for permitting or refusing the forced transfer is displayed on a display 506 (see FIG. 15) of operation terminal 500A installed in work station 500.

Worker U selects either permission or refusal of the forced transfer on the selection screen displayed on display 506 of operation terminal 500A. The permission or refusal of the forced transfer may be selected by a touch operation on display 506 or by an input operation on an input device connected to operation terminal 500A.

When the permission of the forced transfer is selected, control device 50 starts transfer of in-process pallet PL5 from work station 500 to pallet storage 200. On the other hand, when the refusal of the forced transfer is selected, control device 50 interrupts the forced transfer of in-process pallet PL5, and stores pallet PL2 on which machined workpiece W2 is loaded in pallet storage 200.

In this manner, control device 50 receives the permission from worker U for the forced transfer of in-process pallet PL5, thereby suppressing the forced transfer of the pallet such that the workpiece attaching work is completed shortly afterwards.

<D. Modifications of Method for Transferring Machining Completed Pallet>

The method for transferring machining completed pallet PL2 is not limited to the examples illustrated in FIGS. 3 to 9. In the following description, first to third modifications of the method for transferring machining completed pallet PL2 will be described in order.

(D1. First Modification)

The first modification of the method for transferring machining completed pallet PL2 will be described below.

Although the example in which the transfer of machining completed pallet PL2 to work station 500 is executed after the forced transfer of in-process pallet PL5 is completed, machining completed pallet PL2 may be transferred in parallel with the transfer of in-process pallet PL5. That is, control device 50 may execute the transfer of pallet PL2 from machine tool 400 to work station 500 in parallel with the transfer of pallet PL5 from work station 500 to pallet storage 200.

In this case, transfer device 300 includes a plurality of carriages 331. Each carriage 331 may be driven on different transfer paths, or may be driven on a common transfer path. When the transfer path is shared, control device 50 controls the drive of the plurality of carriages 331 such that carriages 331 do not collide with each other.

(D2. Second Modification)

The second modification of the method for transferring the machining completed pallet will be described below.

The example in which the forced transfer of in-process pallet PL5 is started after the machining of workpiece W2 is completed is described. However, the forced transfer of in-process pallet PL5 may be started before the machining of workpiece W2 is completed.

As an example, control device 50 starts the forced transfer of pallet PL5 from work station 500 to pallet storage 200 when the machining of workpiece W2 attached to pallet PL2 is completed within a predetermined time (for example, within 1 to 2 minutes) from a present time. When the machining of workpiece W2 is completed, work station 500 transfers pallet PL2 from machine tool 400 to work station 500 after the transfer of pallet PL5 from work station 500 to pallet storage 200 is completed. Alternatively, when the machining of workpiece W2 is completed, work station 500 transfers pallet PL2 from machine tool 400 to work station 500 in parallel with the transfer of pallet PL5 from work station 500 to pallet storage 200.

Preferably, control device 50 compares a scheduled machining completion time of the machining of workpiece W2 with a scheduled work completion time of the work of attaching workpiece W5 to pallet PL5, and decides whether to forcedly transfer in-process pallet PL5 based on the comparison result. As an example, when the machining completion time is earlier than the work completion time, control device 50 forcedly transfers in-process pallet PL5. On the other hand, when the machining completion time is later than the work completion time, control device 50 does not forcedly transfer in-process pallet PL5. The method for estimating the machining completion time will be described later.

For example, the work completion time is estimated based on history information 128 (see FIG. 12) described later. Information about work information is stored in history information 128. As an example, in history information 128, personal identification information for identifying the worker, work identification information indicating a type of the work performed by the worker, and a work time required for the work are associated with a type of the workpiece. Based on the reception of a machining instruction of the workpiece, control device 50 refers to history information 128 to acquire the work time associated with the workpiece to be worked. When there are a plurality of such working hours, the control device 50 calculates the average of the acquired working hours. Control device 50 adds the work time to the work start time for the workpiece to be worked, and estimates the addition result as the work completion time.

(D3. Third Modification)

The third modification of the method for transferring the machining completed pallet will be described below.

When there are a plurality of machining completed pallets, control device 50 determines the transfer order of each of the machining completed pallets according to the priority of the workpiece loaded on each of the machining completed pallets. For example, the transfer order is determined based on workpiece information 126 illustrated in FIG. 10. FIG. 10 is a view illustrating an example of the data structure of workpiece information 126.

As illustrated in FIG. 10, workpiece information 126 defines various pieces of information related to the machining and transfer of the workpiece. For example, the various pieces of information defined in workpiece information 126 are previously set by a user. As an example, workpiece information 126 defines a transfer priority, a setup work time, and a machining time according to the type of the workpiece. The transfer priority indicates the priority of the transfer order. The setup work time indicates the time required to attach the workpiece to the pallet. The machining time indicates the time required for machine tool 400 to machine the workpiece.

When there are a plurality of machining completed pallets, control device 50 refers to workpiece information 126 to specify a transfer priority of the workpiece to be loaded on each of the machining completed pallets. Then, control device 50 transfers the machining completed pallet on which the workpiece having a higher transfer priority is loaded over other machining completed pallets.

<E. Method for Estimating Machining Completion Time of Workpiece>

As described above, control device 50 forcedly transfers the in-process pallet located in work station 500 when the machining of the workpiece is completed or when the machining of the workpiece is completed within a predetermined time. In order to perform such forced transfer, control device 50 needs to grasp the machining completion time of the workpiece. The machining completion time of the workpiece can be estimated by various methods. In the following description, specific examples 1 to 3 of the method for estimating the machining completion time of the workpiece will be described in order.

(E1. Specific Example 1)

With reference to FIG. 10, the specific example 1 of a method for estimating the machining completion time will be described.

Based on the reception of the machining instruction of the workpiece, the control device 50 of the pallet transfer system 10 refers to the workpiece information 126 shown in FIG. 10 and acquires the machining time associated with the workpiece to be machined. Control device 50 adds the machining time acquired from workpiece information 126 to the machining start time of the workpiece to be machined, and estimates the addition result as the machining completion time.

(E2. Specific Example 2)

The specific example 2 of the method for estimating the machining completion time will be described below.

In the specific example 2, control device 50 of pallet transfer system 10 estimates the machining completion time of the workpiece based on history information 128 (see FIG. 12) described later. As an example, history information 128 stores the actual machining time required for the machining of the workpiece by each type of the workpiece.

Based on the reception of the machining instruction of the workpiece, control device 50 refers to history information 128 to acquire the machining time associated with the workpiece to be machined. When there are a plurality of such machining times, control device 50 calculates an average of the acquired machining times. Control device 50 adds the machining time to the machining start time of the workpiece to be machined, and estimates the addition result as the machining completion time.

(E3. Specific Example 3)

The specific example 3 of the method for estimating the machining completion time will be described below.

In the specific example 3, control device 50 pre-reads a machining program 422 (see FIG. 14) described later to estimate the machining completion time of the workpiece.

As an example, control device 50 of pallet transfer system 10 acquires an instruction group called till a step indicating the machining completion from an executing step in machining program 422, and calculates a total execution time required to execute the instruction group. For example, the total execution time is calculated based on execution time information in which the execution time is defined for each type of the instruction. Control device 50 adds the total execution time to the machining start time of the workpiece to be machined, and estimates the addition result as the machining completion time.

<F. Data Sharing Method>

Figure 11:
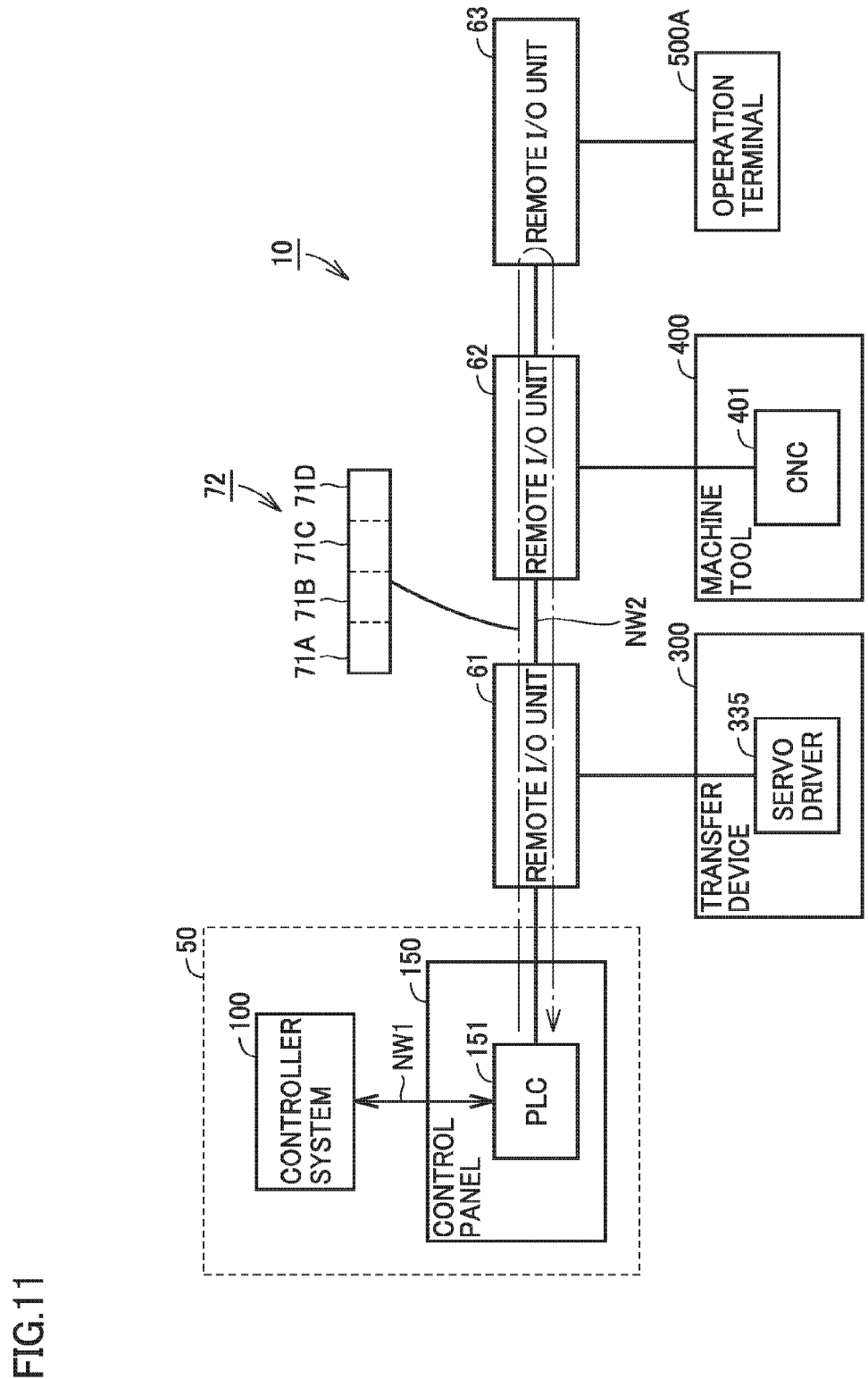
FIG. 11 is a conceptual view schematically illustrating a cooperative relationship of various devices constituting the pallet transfer system.

With reference to FIG. 11, a data sharing method between various devices constituting pallet transfer system 10 will be described. FIG. 11 is a conceptual view schematically illustrating a cooperative relationship of various devices constituting pallet transfer system 10.

As described above, control system 100 and PLC 151 are connected to network NW1 such as Ethernet. Remote I/O units 61 to 63 and PLC 151 are connected to network NW2 that is a field network.

A frame 72 is transmitted to network NW2. Frame 72 orbits network NW2 at predetermined control cycles. Remote I/O units 61 to 63 and PLC 151 share various data through frame 72.

For example, frame 72 includes a data area 71A for PLC 151, a data area 71B for transfer device 300 connected to remote I/O unit 61, and a data area 71C for machine tool 400 connected to remote I/O unit 62, and a data area 71D for operation terminal 500A connected to remote I/O unit 63.

Data area 71A of frame 72 is an area in which PLC 151 writes various data. A transfer instruction of pallet PL and the like are written in data area 71A. The transfer instruction includes a transfer destination of pallet PL. For example, the transfer destination is expressed by an identification number indicating a storage location in pallet storage 200 (for example, an ID (Identification) indicating the storage location) or an identification number identifying machine tool 400 (for example, the ID of the machine tool). Various data written in data area 71A by PLC 151 can be referred to by various devices connected to network NW2.

Data area 71B of frame 72 is an area in which remote I/O unit 61 writes various data related to transfer device 300. Various data written in data area 71B are referred to by various devices connected to network NW2.

Data area 71C of frame 72 is an area in which remote I/O unit 62 writes various data related to machine tool 400. Various data written in data area 71C are referred to by various devices connected to network NW2.

For example, data area 71D of frame 72 is an area in which remote I/O unit 63 writes operation contents for operation terminal 500A. As an example, the selection result of permission or refusal for the forced transfer of the pallet from work station 500 is written in data area 71D of frame 72.

<G. Hardware Configuration of Control System 100>

Figure 12:
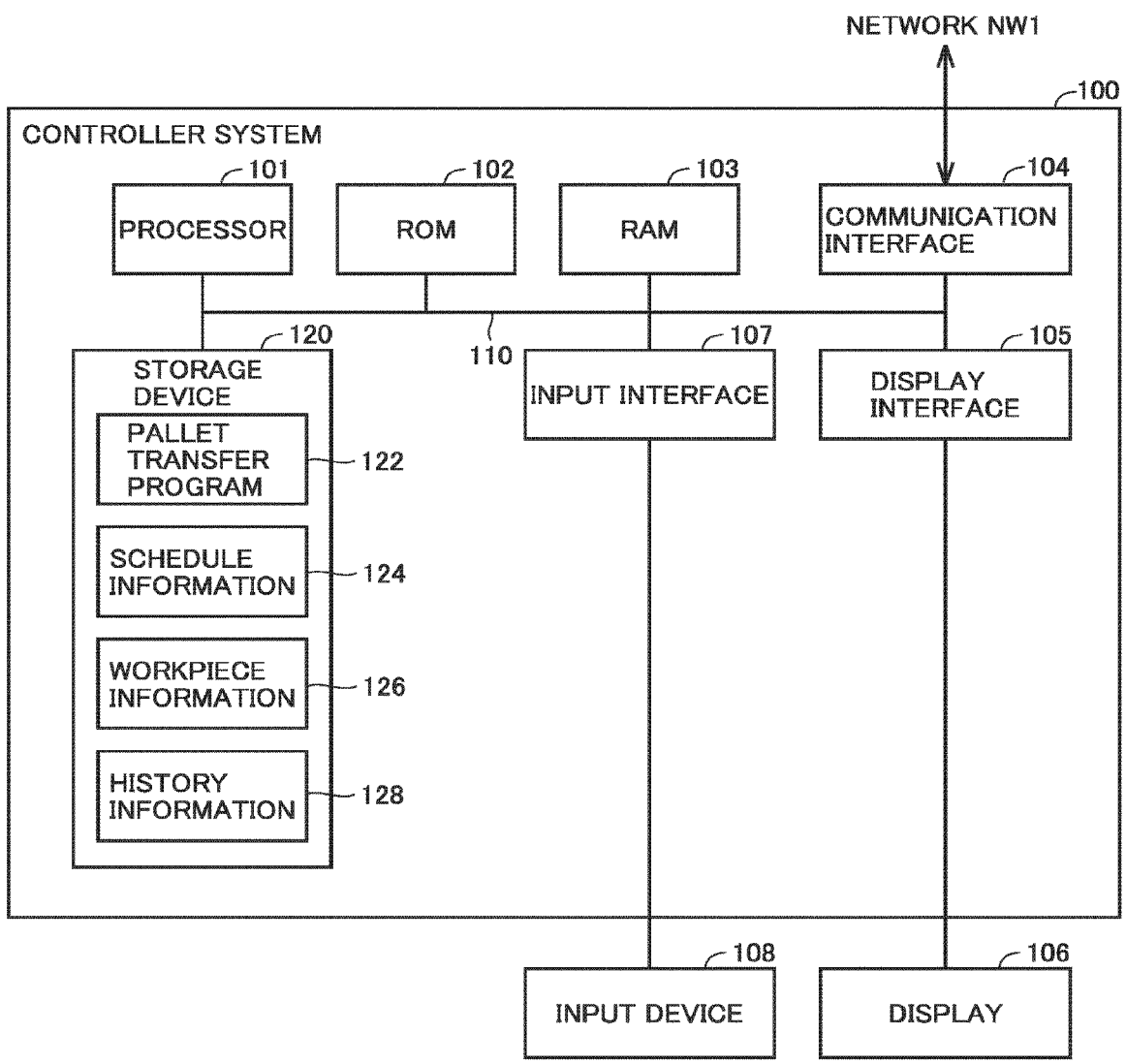
FIG. 12 is a schematic diagram illustrating an example of a hardware configuration of a controller system.

With reference to FIG. 12, a hardware configuration of control system 100 will be described. FIG. 12 is a schematic diagram illustrating an example of the hardware configuration of control system 100.

Control system 100 includes a processor 101, a ROM (Read Only Memory) 102, a RAM (Random Access Memory) 103, a communication interface 104, a display interface 105, an input interface 107, and a storage device 120. These components are connected to a bus 110.

For example, processor 101 is constructed with at least one integrated circuit. For example, the integrated circuit may be constructed with at least one CPU (Central Processing Unit), at least one GPU (Graphics Processing Unit), at least one ASIC (Application Specific Integrated Circuit), at least one FPGA (Field Programmable Gate Array), or a combination thereof.

Processor 101 controls a motion of control system 100 by executing various programs such as a pallet transfer program 122 and an operating system. Processor 101 reads pallet transfer program 122 from storage device 120 or ROM 102 to RAM 103 based on the reception of the execution instruction of pallet transfer program 122. RAM 103 functions as a working memory, and temporarily stores various data necessary for executing pallet transfer program 122.

A LAN (Local Area Network), an antenna, and the like are connected to communication interface 104. Control system 100 is connected to network NW1 through communication interface 104. As a result, control system 100 exchanges data with an external device connected to network NW1. For example, the external device includes a control panel 150, a server (not illustrated), and the like. Control system 100 may be configured so as to download pallet transfer program 122 from the external device.

Display 106 is connected to display interface 105. Display interface 105 sends an image signal that displays an image to display 106 according to a command from processor 101 or the like. For example, display 106 is a liquid crystal display, an organic EL (Electro Luminescence) display, or other display devices. Display 106 may be configured integrally with control system 100, or may be configured separately from control system 100.

An input device 108 is connected to input interface 107. For example, input device 108 is a mouse, a keyboard, a touch panel, or other devices capable of accepting user operations. Input device 108 may be integrally configured with control system 100, or may be configured separately from control system 100.

For example, storage device 120 is a storage medium such as a hard disk or a flash memory. Storage device 120 stores pallet transfer program 122, schedule information 124, workpiece information 126, history information 128, and the like. Transfer order of the pallet (or the workpiece), a machining priority of the pallet (or the workpiece), and the like are defined in schedule information 124. The storage location of various data stored in storage device 120 is not limited to storage device 120, but may be stored in a storage area (for example, cache memory) of the processor 101, ROM 102, RAM 103, an external device (for example, a server), and the like.

Pallet transfer program 122 may be provided not as a stand-alone program, but as a part of any program. In this case, the transfer control processing by pallet transfer program 122 is performed in cooperation with an arbitrary program. Even a program that does not include such a part of modules does not deviate from the purpose of pallet transfer program 122 according to the present embodiment. Further, some or all of the functions provided by pallet transfer program 122 may be performed by dedicated hardware. Further, control system 100 may be configured in a form of what is called cloud service in which at least one server executes a part of the processing of pallet transfer program 122.

<H. Hardware Configuration of PLC 151>

Figure 13:
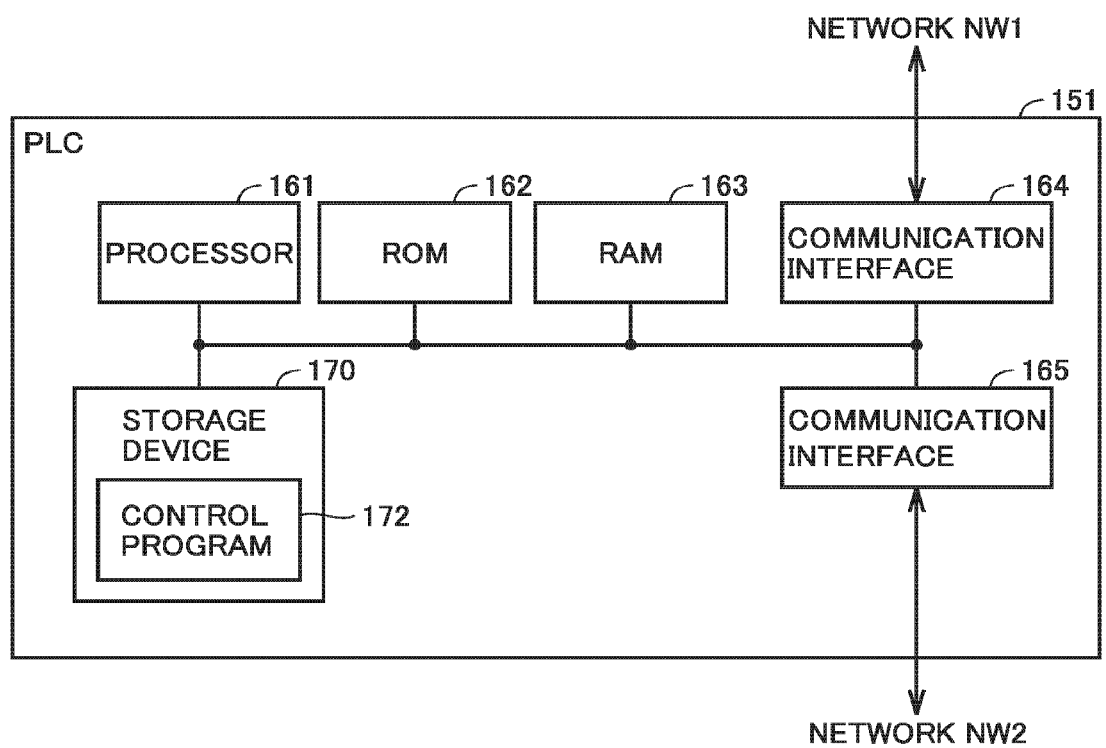
FIG. 13 is a block diagram illustrating a main hardware configuration of a PLC (Programmable Logic Controller).

With reference to FIG. 13, an example of the hardware configuration of PLC 151 will be described. FIG. 13 is a block diagram illustrating a main hardware configuration of PLC 151.

PLC 151 includes a processor 161, a ROM (Read Only Memory) 162, a RAM (Random Access Memory) 163, communication interfaces 164, 165, and a storage device 170.

Processor 161 is constructed with at least one integrated circuit. For example, the integrated circuit is constructed with at least one CPU, at least one MPU (Micro Processing Unit), at least one ASIC, at least one FPGA, or a combination thereof.

Processor 161 controls the motions of transfer device 300 and machine tool 400 by executing various programs such as a control program 172. Processor 161 reads control program 172 from storage device 170 to ROM 162 based on the reception of an execution instruction of control program 172. RAM 163 functions as a working memory, and temporarily stores various data necessary for the execution of control program 172.

A LAN, an antenna, and the like are connected to communication interface 164. PLC 151 is connected to network NW1 through communication interface 164. As a result, PLC 151 exchanges data with an external device connected to network NW1. For example, the external device includes control system 100, a server (not illustrated), and the like.

Communication interface 165 is an interface connected to network NW2 that is a field network. PLC 151 exchanges data with an external device connected to network NW2 through communication interface 165. For example, the external device includes remote I/O units 61 to 63 and the like.

For example, storage device 170 is a storage medium such as a hard disk or a flash memory. Storage device 170 stores control program 172 and the like. The storage location of control program 172 is not limited to storage device 170, but may be stored in the storage area (for example, a cache area) of processor 161, ROM 162, RAM 163, an external device (for example, a server), or the like.

Control program 172 may be provided not as a stand-alone program, but as a part of any program. In this case, the control processing according to the present embodiment is performed in cooperation with an arbitrary program. Even a program that does not include such a part of modules does not deviate from the purpose of control program 172 according to the present embodiment. Further, some or all of the functions provided by control program 172 may be performed by dedicated hardware. Further, PLC 151 may be configured in a form of what is called cloud service in which at least one server executes a part of the processing of control program 172.

<I. Hardware Configuration of Machine Tool 400>

Figure 14:
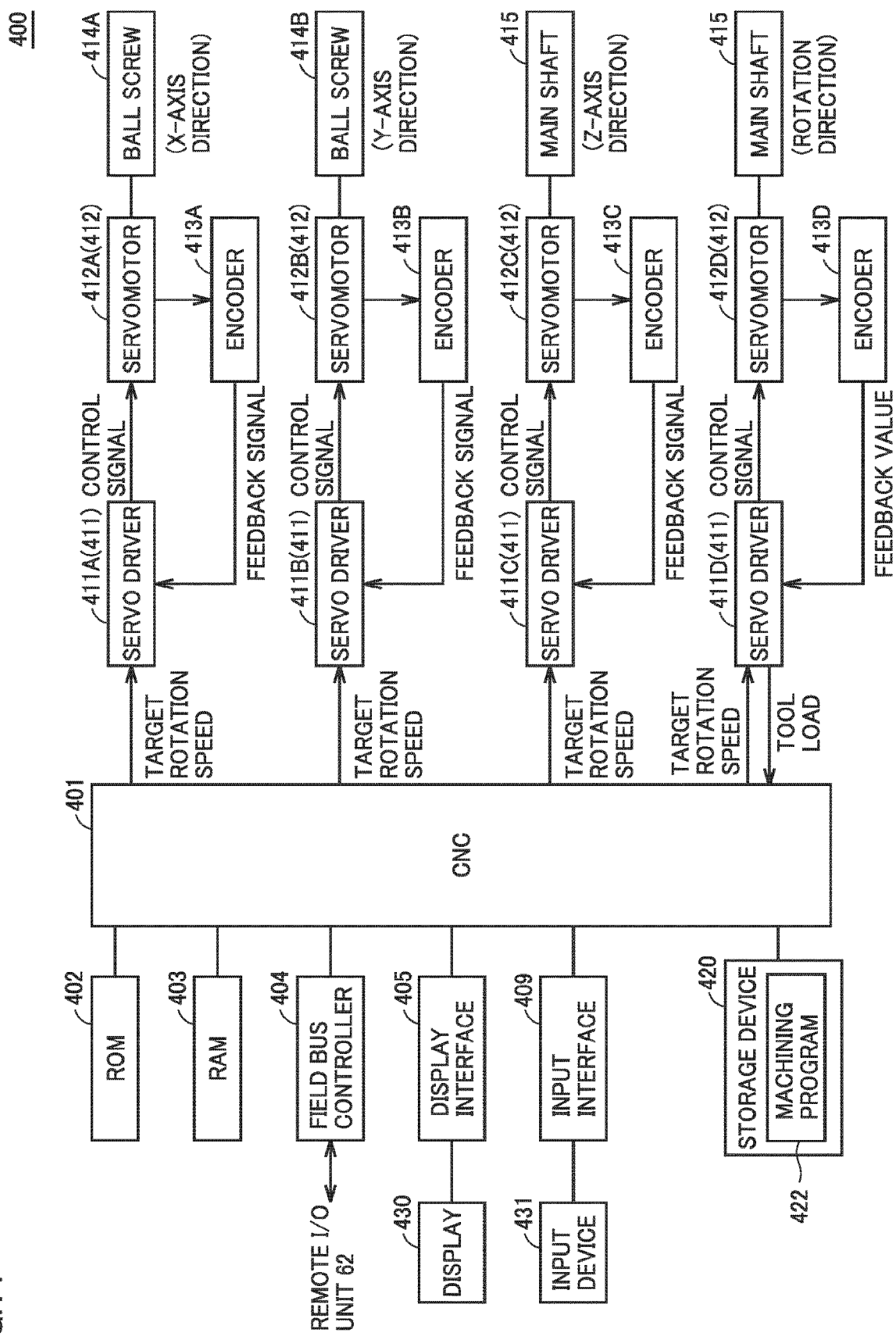
FIG. 14 is a block diagram illustrating a main hardware configuration of a machine tool.

With reference to FIG. 14, an example of the hardware configuration of machine tool 400 will be described. FIG. 14 is a block diagram illustrating a main hardware configuration of machine tool 400.

Machine tool 400 includes a CNC 401, a ROM 402, a RAM 403, a field bus controller 404, a display interface 405, an input interface 409, servo drivers 411A to 411D, servomotors 412A to 412D, encoders 413A to 413D, ball screws 414A, 414B, and a main shaft 415 that attaches tools. These devices are connected through a bus (not illustrated).

CNC 401 is constructed with at least one integrated circuit. For example, the integrated circuit is constructed with at least one CPU, at least one MPU, at least one ASIC, at least one FPGA, or a combination thereof.

CNC 401 controls the motion of machine tool 400 by executing various programs such as machining program 422. CNC 401 reads machining program 422 from storage device 420 in ROM 402 based on the reception of the execution instruction of machining program 422. RAM 403 functions as a working memory, and temporarily stores various data necessary for executing machining program 422.

Field bus controller 404 is an interface that conducts communication with PLC 151 through remote I/O unit 62. CNC 401 exchanges data with PLC 151 through field bus controller 404.

Display interface 405 is connected to a display device such as a display 430, and sends an image signal that displays an image to display 430 according to a command from CNC 401 or the like. For example, display 430 is a liquid crystal display, an organic EL display, or other display devices.

Input interface 409 may be connected to an input device 431. For example, input device 431 is a mouse, a keyboard, a touch panel, or other input devices capable of accepting user operations.

CNC 401 controls servo driver 411A according to machining program 422. Servo driver 411A sequentially receives the input of the target rotation speed (or the target position) from CNC 401, controls servomotor 412A so that servomotor 412A rotates at the target rotation speed, and drives a workpiece installation table (not illustrated) in an X-axis direction. More specifically, servo driver 411A calculates the actual rotation speed (or actual position) of servomotor 412A from a feedback signal of encoder 413A, increases the rotation speed of servomotor 412A when the actual rotation speed is smaller than the target rotation speed, and decreases the rotation speed of servomotor 412A when the actual rotation speed is larger than the target rotation speed. In this way, servo driver 411A brings the rotation speed of servomotor 412A close to the target rotation speed while sequentially receiving feedback of the rotation speed of servomotor 412A. Servo driver 411A moves the workpiece installation table connected to ball screw 414A in the X-axis direction, and moves the workpiece installation table to an arbitrary position in the X-axis direction.

By the same motor control, servo driver 411B moves the workpiece installation table connected to ball screw 414B in a Y-axis direction according to the control command from CNC 401, and moves the workpiece installation table to an arbitrary position in the Y-axis direction. By the same motor control, servo driver 411C moves main shaft 415 in a Z-axis direction according to the control command from CNC 401, and moves main shaft 415 to an arbitrary position in the Z-axis direction. By the same motor control, servo driver 411D controls the rotation speed of main shaft 415 according to the control command from CNC 401.

For example, storage device 420 is a storage medium such as a hard disk or a flash memory. Storage device 420 stores machining program 422 and the like. The storage location of machining program 422 is not limited to storage device 420, but may be stored in the storage area (for example, a cache area) of CNC 401, ROM 402, RAM 403, an external device (for example, a server), or the like.

<J. Hardware Configuration of Operation Terminal 500A>

Figure 15:
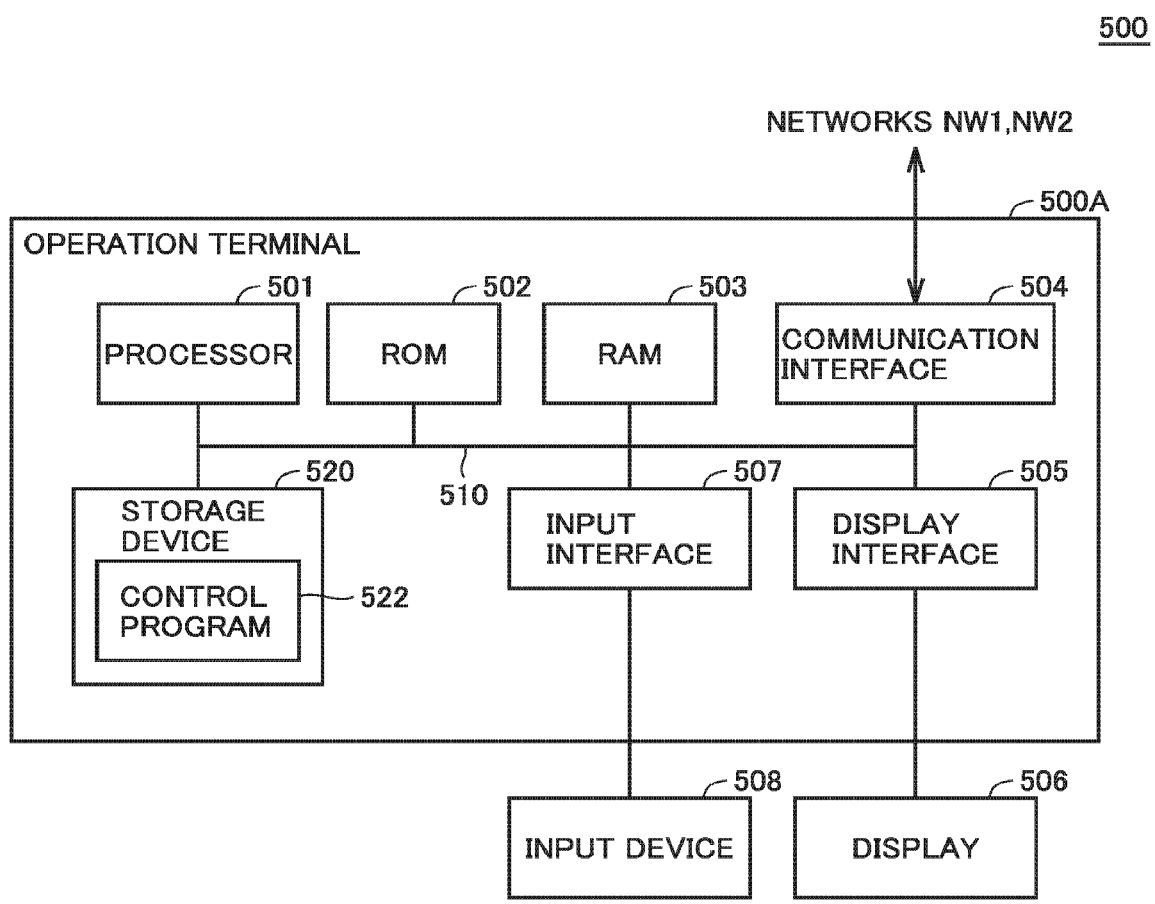
FIG. 15 is a schematic diagram illustrating an example of a hardware configuration of an operation terminal.

With reference to FIG. 15, the hardware configuration of operation terminal 500A will be described. FIG. 15 is a schematic diagram illustrating an example of the hardware configuration of operation terminal 500A.

Operation terminal 500A includes a processor 501, a ROM 502, a RAM 503, a communication interface 504, a display interface 505, an input interface 507, and a storage device 520. These components are connected to a bus 510.

For example, processor 501 is constructed with at least one integrated circuit. For example, the integrated circuit may be constructed with at least one CPU, at least one GPU, at least one ASIC, at least one FPGA, or a combination thereof.

Processor 501 controls the motion of operation terminal 500A by executing various programs such as a control program 522 and the operating system. Processor 501 reads control program 522 from storage device 520 or ROM 502 to RAM 503 based on the reception of the execution instruction of control program 522. RAM 503 functions as a working memory, and temporarily stores various data necessary for the execution of control program 522.

A LAN, an antenna, and the like are connected to communication interface 504. Operation terminal 500A is connected to networks NW1, NW2 through communication interface 504. As a result, operation terminal 500A exchanges data with external devices connected to networks NW1, NW2. For example, the external device includes control panel 150, a server (not illustrated), and the like. Operation terminal 500A may be configured so that control program 522 can be downloaded from the external device.

A display 506 is connected to display interface 505. Display interface 505 sends an image signal that displays an image to display 506 according to a command from processor 501 or the like. Display 506 displays a selection screen that accepts the permission or refusal of forced transmission of the in-process pallet at work station 500 or the like. For example, display 506 is a liquid crystal display, an organic EL display, or other display devices. Display 506 may be configured integrally with operation terminal 500A, or may be configured separately from operation terminal 500A.

An input device 508 is connected to input interface 507. For example, input device 508 is a mouse, a keyboard, a touch panel, or other devices capable of accepting a user operation. Input device 508 may be configured integrally with operation terminal 500A, or may be configured separately from operation terminal 500A.

For example, storage device 520 is a storage medium such as a hard disk or a flash memory. Storage device 520 stores control program 522 and the like. The storage location of control program 522 is not limited to the storage device 520, but may be stored in the storage area (for example, cache memory) of processor 501, ROM 502, RAM 503, an external device (for example, a server), or the like.

Control program 522 may be provided as a stand-alone program, but as a part of an arbitrary program. In this case, the control processing by control program 522 is performed in cooperation with an arbitrary program. Even a program that does not include such a part of modules does not deviate from the purpose of control program 522 according to the present embodiment. Further, some or all of the functions provided by control program 522 may be performed by dedicated hardware. Further, operation terminal 500A may be configured in a form of what is called cloud service in which at least one server executes a part of the processing of control program 522.

<K. Control Flow>

Figure 16:
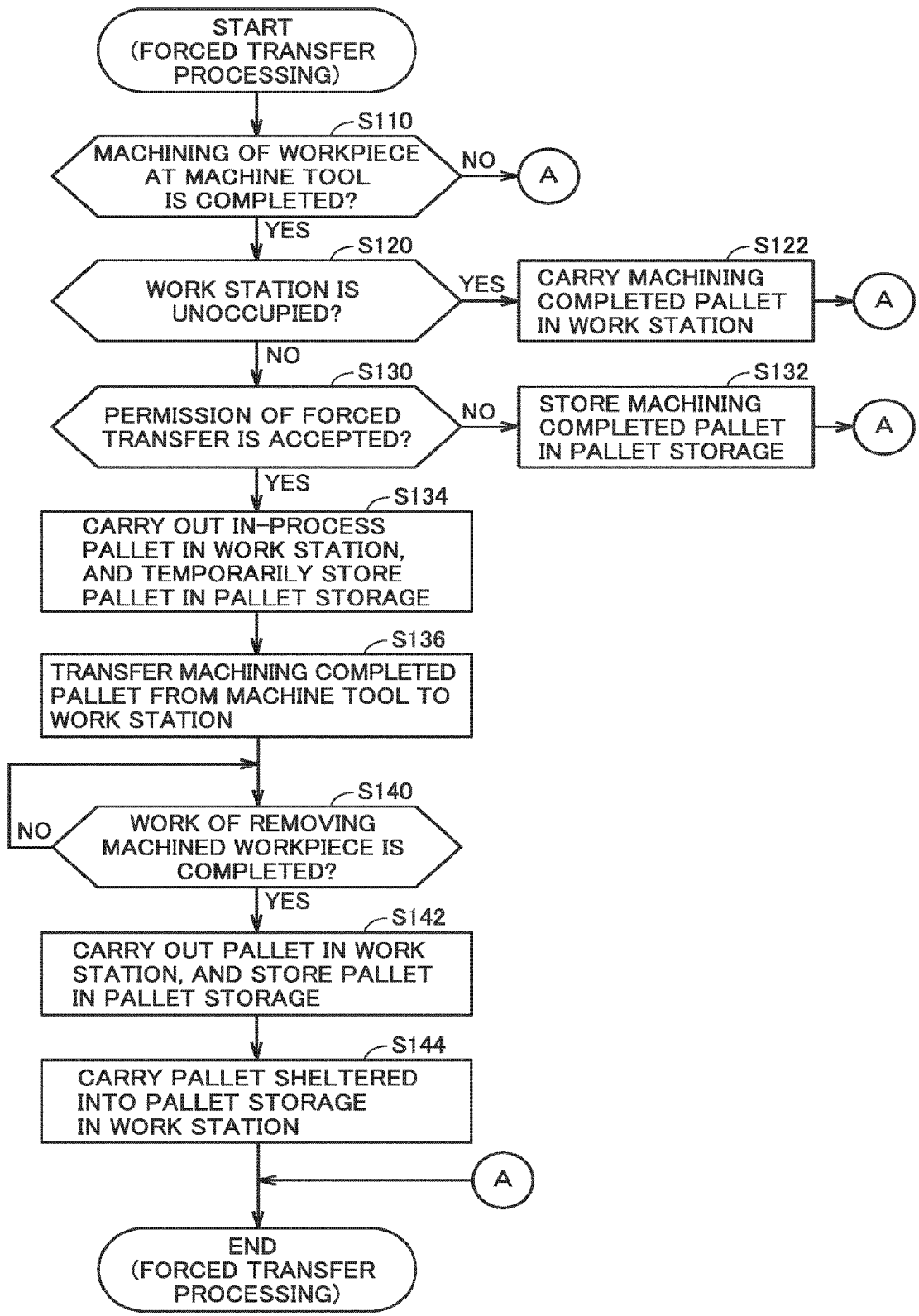
FIG. 16 is a flowchart illustrating a part of processing executed by a control device.

With reference to FIG. 16, a control flowchart of control device 50 of pallet transfer system 10 will be described. FIG. 16 is a flowchart illustrating a part of processing executed by control device 50. The control processing illustrated in FIG. 16 is executed in parallel with the normal pallet transfer processing.

In step S110, control device 50 determines whether or not the machining of the workpiece at machine tool 400 is completed. For example, whether or not the machining is completed is determined based on a machining state variable defined in machining program 422 (see FIG. 14). For example, the machining state variable indicates "TRUE" during the machining and "FALSE" during non-machining. CNC 401 writes the value of the machining state variable in frame 72 (see FIG. 11), and the value of the machining state variable is transmitted to control device 50 at regular intervals. For example, control device 50 determines that the machining of the workpiece is completed in machine tool 400 based on a change of the value of the machining state variable from "TRUE" to "FALSE".

When determining that the machining of the workpiece in machine tool 400 is completed (YES in step S110), control device 50 switches the control to step S120. Otherwise (NO in step S110), control device 50 ends the processing in FIG. 16.

In step S120, control device 50 determines whether or not work station 500 is unoccupied. Whether or not work station 500 is unoccupied is determined based on a work state variable defined in pallet transfer program 122. For example, the work state variable indicates a first value (for example, TRUE) during the work, and indicates a second value (for example, FALSE) during non-work. The value of the work state variable is written in frame 72 (see FIG. 11), and transmitted to control device 50 at regular intervals. For example, control device 50 determines that work station 500 is unoccupied when the value of the work state variable indicates the first value.

When determining that work station 500 is unoccupied (YES in step S120), control device 50 switches the control to step S122. Otherwise (NO in step S120), control device 50 switches the control to step S130.

In step S122, control device 50 transfers the machining completed pallet from machine tool 400 to work station 500.

In step S130, control device 50 determines whether or not the permission of the forced transfer is accepted. For example, the selection screen indicating permitting or refusing the forced transfer is displayed on display 506 (see FIG. 15) of operation terminal 500A. Control device 50 switches the control to step S132 when the permission of the forced transfer is selected on the selection screen (YES in step S130). Otherwise (NO in step S130), control device 50 switches the control to step S134.

In step S132, control device 50 stores the machining completed pallet located in machine tool 400 in the unoccupied space of pallet storage 200. When there are a plurality of unoccupied spaces in pallet storage 200, control device 50 stores the machining completed pallets in the unoccupied space closest to work station 500.

In step S134, control device 50 carries out the in-process pallet from work station 500, and temporarily stores the pallet in the unoccupied space of pallet storage 200. When there are a plurality of unoccupied spaces in pallet storage 200, control device 50 shelters the in-process pallet in the unoccupied space closest to work station 500.

In step S136, control device 50 carries the machining completed pallet located in machine tool 400 in work station 500 based on the completion of the shelter processing of the in-process pallet.

In step S140, control device 50 determines whether or not the work of removing the machined workpiece for the pallet carried in work station 500 is completed. As an example, control device 50 determines that the removal work is completed based on detection of pressing of a work completion button (not illustrated) provided in work station 500. The work completion button may be a physical button or a button displayed on a touch panel or the like. The completion of the removal work may be detected by detection means other than the work completion button. When determining that the work of removing the machined workpiece is completed (YES in step S140), control device 50 switches the control to step S142. Otherwise (NO in step S140), control device 50 executes the processing in step S140 again.

In step S142, control device 50 carries out the empty pallet from work station 500, and stores the empty pallet in the unoccupied space of pallet storage 200.

In step S144, control device 50 carries the pallet temporarily sheltered into pallet storage 200 in step S134 in work station 500.

In the above description, in step S110, control device 50 determines whether or not the machining of the workpiece in machine tool 400 is completed. Alternatively, whether or not the machining of the workpiece is completed within a predetermined time from the present may be determined. That is, in step S110, control device 50 determines whether or not the machining of the workpiece in the machine tool 400 is about to end. In this case, control device 50 switches the control to step S120 when determining that the machining of the workpiece is completed within the predetermined time from the present (YES in step S110). Otherwise (NO in step S110), control device 50 ends the processing in FIG. 16.

<L. Summary>

As described above, when the machining completed pallet can be transferred to work station 500, control device 50 of pallet transfer system 10 forcedly carries out the in-process pallet in work station 500 from work station 500. Then, control device 50 carries the machining completed pallet in work station 500, and the worker removes the machined workpiece from the carried-in machining completed pallet. In this way, the machined workpiece can be sent to the next production process by prioritizing the transfer of the machining completed pallet to work station 500. As a result, the productivity of the workpiece is improved.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

10: pallet transfer system, 50: control device, 61, 62, 63: remote I/O unit, 71A, 71B, 71C, 71D: data area, 72: flame, 100 control system, 101, 161, 501: processor, 102, 162, 402, 502: ROM, 103, 163, 403, 503: RAM, 104, 164, 165, 504: communication interface, 105, 405, 505: display interface, 106, 430, 506: display, 107, 409, 507: input interface, 108, 431, 508: input device, 110, 510: bus, 120, 170, 420, 520: storage device, 122: pallet transfer program, 124: schedule information, 126: workpiece information, 128: history information, 150: control panel, 151: PLC, 172, 522: control program, 200: pallet storage, 300: transfer device, 330: rail, 331: carriage, 333: fork part, 334, 411, 411A, 411B, 411C, 411D: servo driver, 335, 412, 412A, 412D: servomotor, 400: machine tool, 401: CNC, 404: field bus controller, 413A to 413D: encoder, 414A, 414B: ball screw, 415: main shaft, 422: machining program, 500: work station, 500A: operation terminal

The invention claimed is:

1. A pallet transfer system comprising:
   a transfer device configured to transfer a pallet to which a workpiece is attachable;
   a pallet storage that is one of pallet transfer destinations by the transfer device and configured to store a plurality of pallets;
   a work station that is one of the pallet transfer destinations by the transfer device, where a worker performs work of attaching the workpiece to the pallet transferred from the pallet storage;
   a machine tool that is one of the pallet transfer destinations by the transfer device and configured to machine the workpiece attached to the pallet at the work station; and
   a control device configured to control the transfer device, wherein the control device executes:
   processing for accepting selection for permission or refusal of interruption of the attaching work to a second pallet when the machining of the workpiece attached to a first pallet is completed in a state where the first pallet of the plurality of pallets is in the machine tool and the second pallet of the plurality of pallets is in the work station;

processing for transferring the second pallet from the work station to the pallet storage based on the acceptance of the selection for the permission;

processing for transferring the first pallet from the machine tool to the work station after the completion of transfer of the second pallet from the work station to the pallet storage, or in parallel with the transfer of the second pallet from the work station to the pallet storage; and processing for transferring the first pallet from the machine tool to the pallet storage based on the acceptance of the selection for the refusal.

2. The pallet transfer system according to claim 1, wherein the control device transfers the first pallet from the work station to the pallet storage while transferring the second pallet from the pallet storage to the work station based on the completion of the removal of the workpiece attached to the first pallet at the work station.

3. A pallet transfer system comprising:
a transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage;
a machine tool that is one of the pallet transfer destinations by the transfer device and configured to machine the workpiece attached to the pallet transferred from the work station; and
a control device configured to control the transfer device, wherein the control device executes:
processing for accepting selection for permission or refusal of interruption of the attaching work to a second pallet when the machining of the workpiece attached to a first pallet is completed within a predetermined time from a present time in a state where the first pallet of the plurality of pallets is in the machine tool and the second pallet of the plurality of pallets is in the work station;
processing for transferring the second pallet from the work station to the pallet storage based on the acceptance of the selection for the permission;
processing for transferring the first pallet from the machine tool to the work station after the completion of transfer of the second pallet from the work station to the pallet storage, or in parallel with the transfer of the second pallet from the work station to the pallet storage, when the machining of the workpiece attached to the first pallet is completed; and
processing for transferring the first pallet from the machine tool to the pallet storage based on the acceptance of the selection for the refusal.

4. The pallet transfer system according to claim 3, wherein the control device transfers the first pallet from the work station to the pallet storage while transferring the second pallet from the pallet storage to the work station based on the completion of the removal of the workpiece attached to the first pallet at the work station.

5. A pallet transfer method in a pallet transfer system, the pallet transfer system including:
a transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet at the work station,
the pallet transfer method comprises:
processing for accepting selection for permission or refusal of interruption of the attaching work to a second pallet when the machining of the workpiece attached to a first pallet is completed in a state where the first pallet of the plurality of pallets is in the machine tool and the second pallet of the plurality of pallets is in the work station;
processing for transferring the second pallet from the work station to the pallet storage based on the acceptance of the selection for the permission;
processing for transferring the first pallet from the machine tool to the work station after the completion of the transfer of the second pallet from the work station to the pallet storage, or in parallel with the transfer of the second pallet from the work station to the pallet storage; and
processing for transferring the first pallet from the machine tool to the pallet storage based on the acceptance of the selection for the refusal.

6. A pallet transfer method in a pallet transfer system, the pallet transfer system including:
the transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet transferred from the work station,
the pallet transfer method comprises:
processing for accepting selection for permission or refusal of interruption of the attaching work to a second pallet when the machining of the workpiece attached to a first pallet is completed within a predetermined time from a present time in a state where the first pallet of the plurality of pallets is in the machine tool and the second pallet of the plurality of pallets is in the work station;
processing for transferring the second pallet from the work station to the pallet storage based on the acceptance of the selection for the permission;
processing for transferring the first pallet from the machine tool to the work station after the completion of the transfer of the second pallet from the work station to the pallet storage, or in parallel with the transfer of the second pallet from the work station to the pallet storage, when the machining of the workpiece attached to the first pallet is completed; and
processing for transferring the first pallet from the machine tool to the pallet storage based on the acceptance of the selection for the refusal.

7. A non-transitory computer readable storage medium storing a pallet transfer program executed in a pallet transfer system,
the pallet transfer system including:
the transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet at the work station,
the pallet transfer program causes the pallet transfer system to execute:
processing for accepting selection for permission or refusal of interruption of the attaching work to a second pallet when the machining of the workpiece attached to a first pallet is completed in a state where the first pallet of the plurality of pallets is in the machine tool and the second pallet of the plurality of pallets is in the work station;
processing for transferring the second pallet from the work station to the pallet storage based on the acceptance of the selection for the permission;
processing for transferring the first pallet from the machine tool to the work station after the completion of the transfer of the second pallet from the work station to the pallet storage, or in parallel with the transfer of the second pallet from the work station to the pallet storage; and
processing for transferring the first pallet from the machine tool to the pallet storage based on the acceptance of the selection for the refusal.

8. A non-transitory computer readable storage medium storing a pallet transfer program executed by a pallet transfer system,
the pallet transfer system including:
the transfer device configured to transfer a pallet to which a workpiece is attachable;
a pallet storage that is one of pallet transfer destinations by the transfer device and configured to store a plurality of pallets;
a work station that is one of the pallet transfer destinations by the transfer device, where a worker performs work of attaching the workpiece to the pallet transferred from the pallet storage; and
a machine tool that is one of the pallet transfer destinations by the transfer device and configured to machine the workpiece attached to the pallet transferred from the work station,
the pallet transfer program causes the pallet transfer system to execute:
processing for accepting selection for permission or refusal of interruption of the attaching work to a second pallet when the machining of the workpiece attached to a first pallet is completed within a predetermined time from a present time in a state where the first pallet of the plurality of pallets is in the machine tool and the second pallet of the plurality of pallets is in the work station;
processing for transferring the second pallet from the work station to the pallet storage based on the acceptance of the selection for the permission;
processing for transferring the first pallet from the machine tool to the work station after the completion of the transfer of the second pallet from the work station to the pallet storage, or in parallel with the transfer of the second pallet from the work station to the pallet storage, when the machining of the workpiece attached to the first pallet is completed; and
processing for transferring the first pallet from the machine tool to the pallet storage based on the acceptance of the selection for the refusal.

* * * * *